United States Patent [19]

Mukai et al.

[11] Patent Number: 5,412,942
[45] Date of Patent: May 9, 1995

[54] CATALYTIC CONVERTER DETERIORATION DETECTING SYSTEM FOR ENGINE

[75] Inventors: Yasuo Mukai, Kariya; Yasuhito Takasu, Toyohashi; Masaaki Nakayama, Toyoake, all of Japan

[73] Assignee: Nippondenso Co., Ltd., Aichi, Japan

[21] Appl. No.: 112,209

[22] Filed: Aug. 26, 1993

[30] Foreign Application Priority Data

Aug. 27, 1992 [JP] Japan .................. 4-228564
Mar. 8, 1993 [JP] Japan .................. 5-046777
Apr. 15, 1993 [JP] Japan .................. 5-088547

[51] Int. Cl.⁶ ............................................. F01N 3/20
[52] U.S. Cl. ........................................ 60/276; 60/277; 60/285; 123/703
[58] Field of Search ............. 60/274, 276, 277, 285; 123/703, 674

[56] References Cited

U.S. PATENT DOCUMENTS 4,135,381 1/1979 Sherwin ................. 60/276
4,463,594 8/1984 Raff et al. ............. 123/440
5,115,639 5/1992 Gopp ..................... 60/274
5,172,549 12/1992 Kako ..................... 60/285

Primary Examiner—James C. Yeung
Assistant Examiner—Daniel J. O'Connor
Attorney, Agent, or Firm—Cushman, Darby & Cushman

[57] ABSTRACT

A catalytic converter deterioration detecting system for an engine derives a low-frequency component in an output of a downstream-side oxygen sensor provided downstream of a catalytic converter. The system detects deterioration of the catalytic converter based on the low-frequency component, such as, an amplitude of the low-frequency component or a period of the low-frequency component. For higher detection accuracy, an amplitude of a high-frequency component in the output of the downstream-side oxygen sensor is additionally used for detecting deterioration of the catalytic converter. Specifically, the system determines that the catalytic converter is deteriorated when the low-frequency amplitude is smaller than a given value and the high-frequency amplitude is greater than a given value.

19 Claims, 23 Drawing Sheets

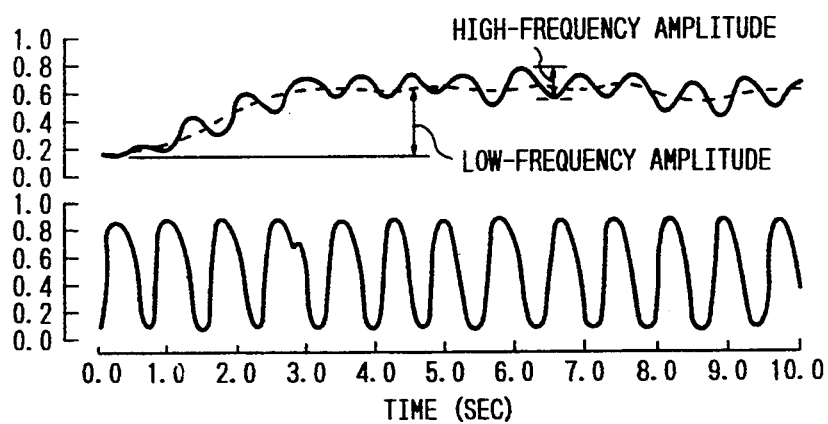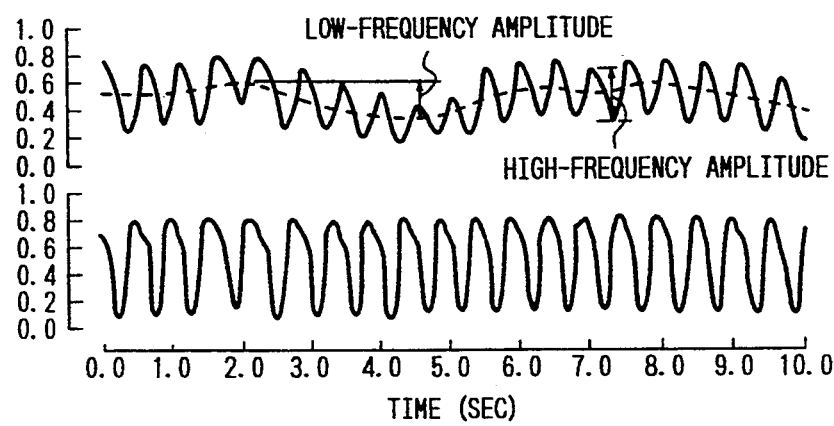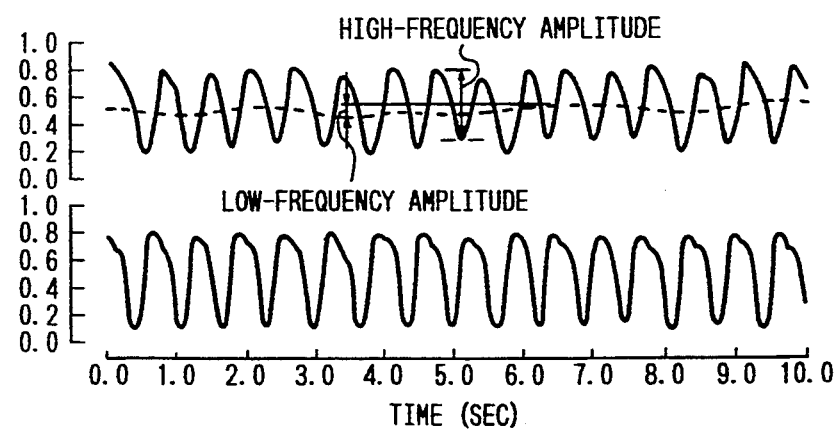

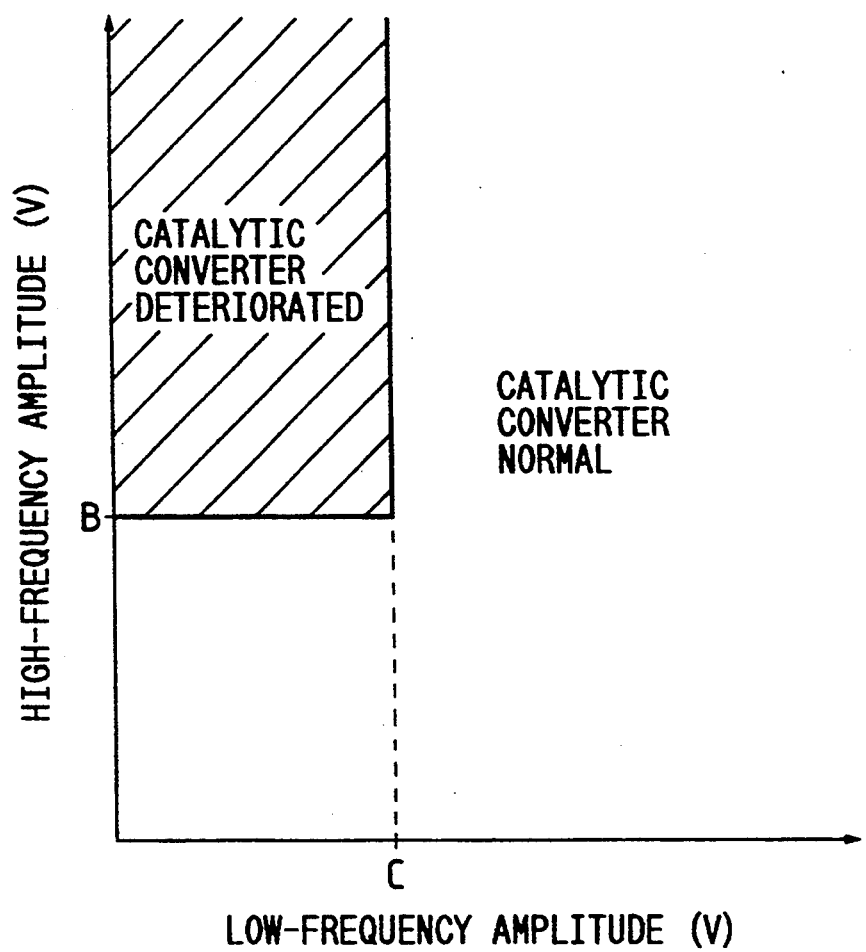

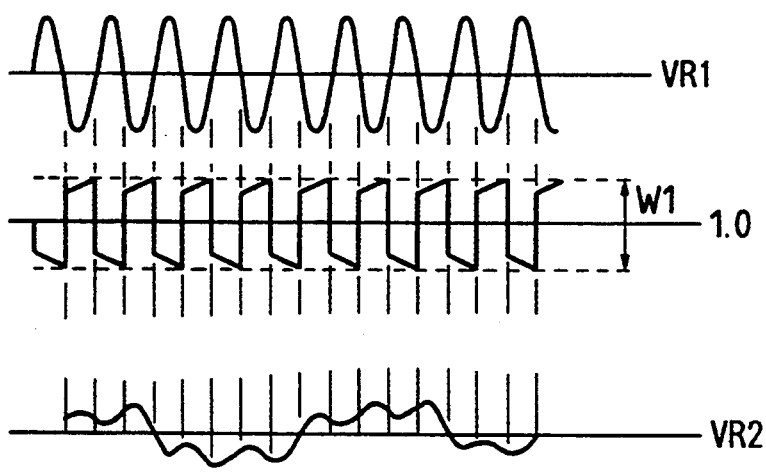
FIG.5(a) V1 (NORMAL)
FIG.5(b) FAF1
FIG.5(c) V2
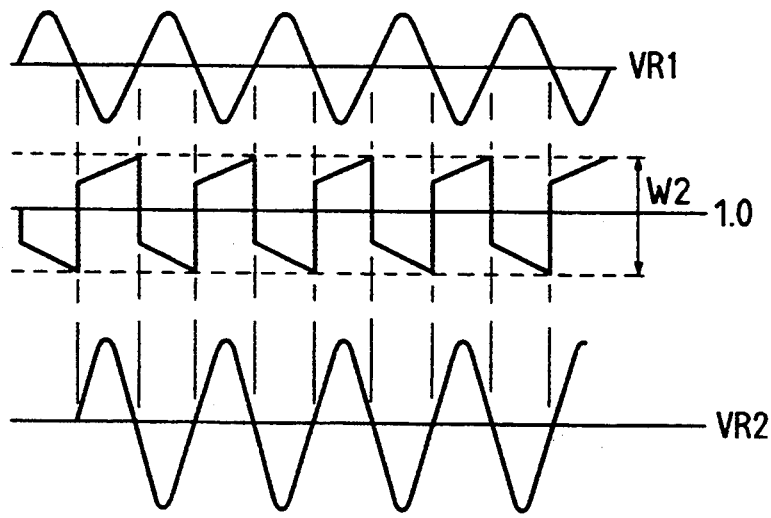
FIG.6(a) V1 (DETERIORATED)
FIG.6(b) FAF
FIG.6(c) V2

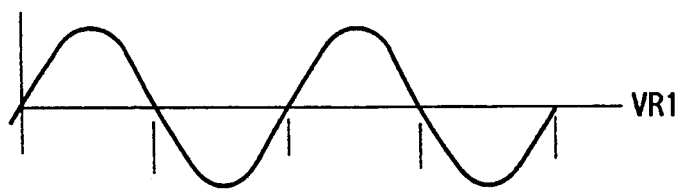
FIG. 8(a) V1
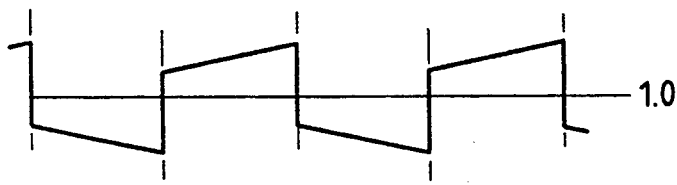
FIG. 8(b) FAF
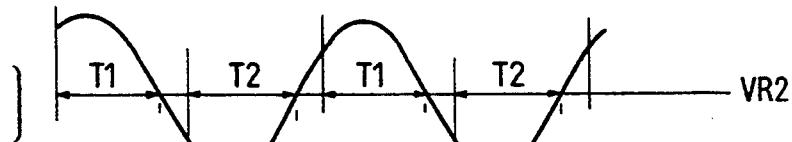
FIG. 8(c) V2 (CATALYTIC CONVERTER NORMAL)
FIG. 8(d) CRL CLR
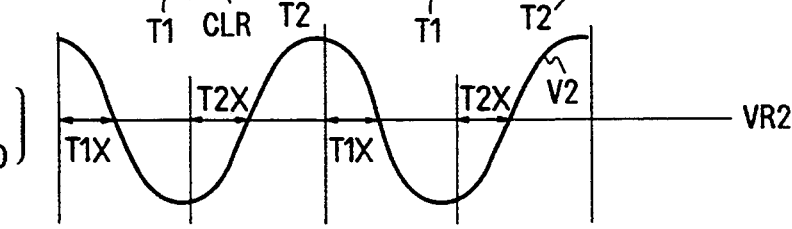
FIG. 8(e) V2 (CATALYTIC CONVERTER DETERIORATED)

FIG. 14(a) FAF

FIG. 14(b) V2

| MAIN FEEDBACK PERIOD (sec) | 1 | 0.75 | 0.5 | 0.25 |
|---|---|---|---|---|
| HIGH-FREQUENCY AMPLITUDE CRITERION VALUE B (V) | 0.5 | 0.4 | 0.3 | 0.2 |
| LOW-FREQUENCY AMPLITUDE CRITERION VALUE C (V) | 0.2 | 0.3 | 0.4 | 0.6 |

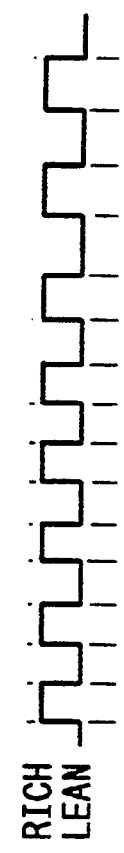
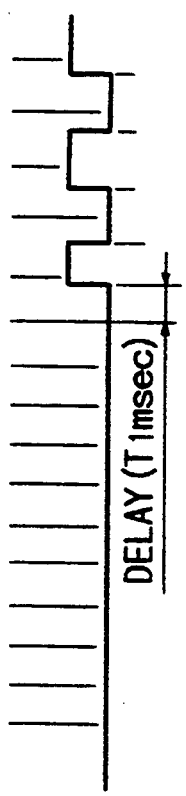
FIG. 18(a) V1
FIG. 18(b) FAF
FIG. 18(c) V2
FIG. 18(d) V2 RICH/LEAN WAVEFORM
FIG. 18(e) XR02D
FIG. 18(f) AUXILIARY CORRECTION COEFFICIENT

FIG. 21(a)(1)
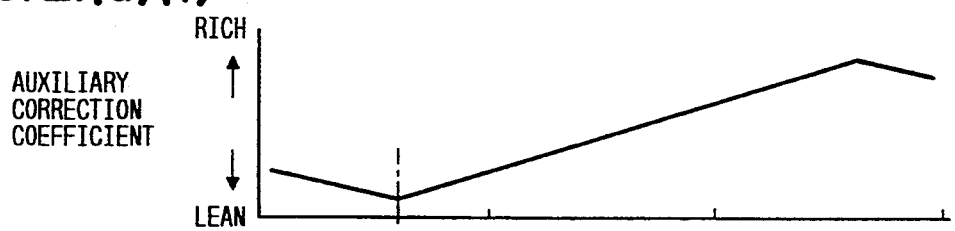
FIG. 21(a)(2)
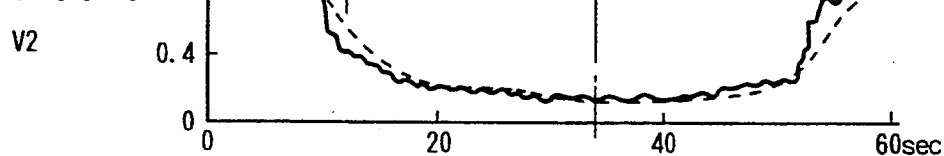
FIG. 21(b)(1)
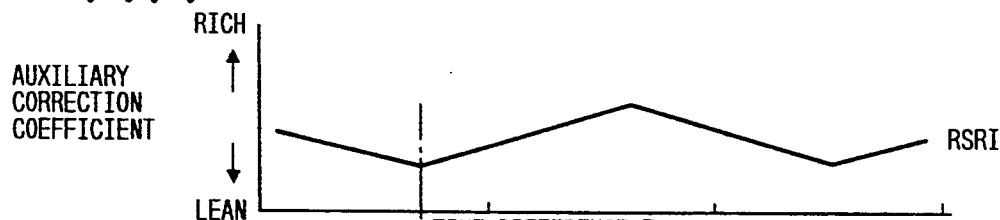
FIG. 21(b)(2)
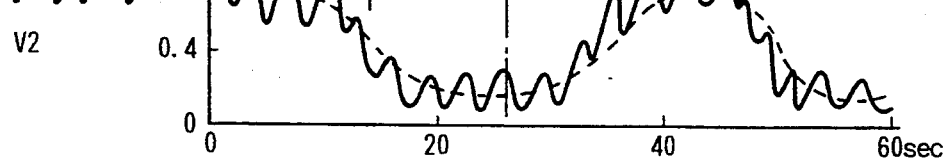
FIG. 21(c)(1)
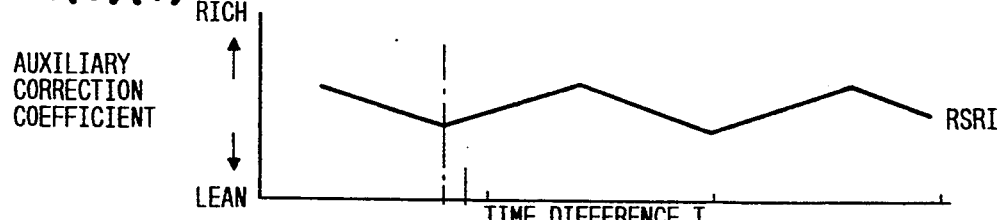
FIG. 21(c)(2)
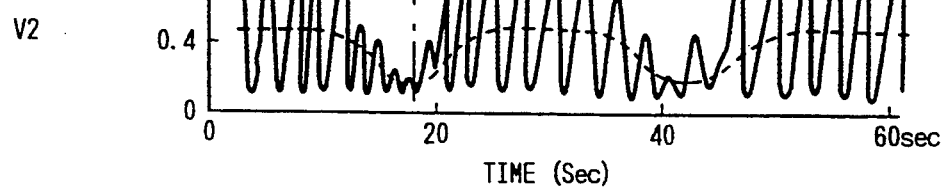

FIG. 26(a)
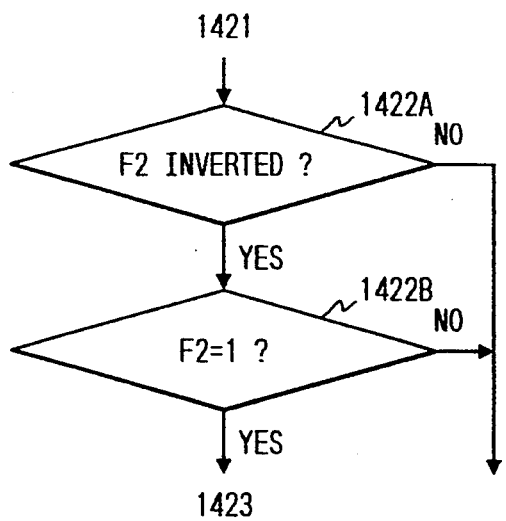
FIG. 26(b)
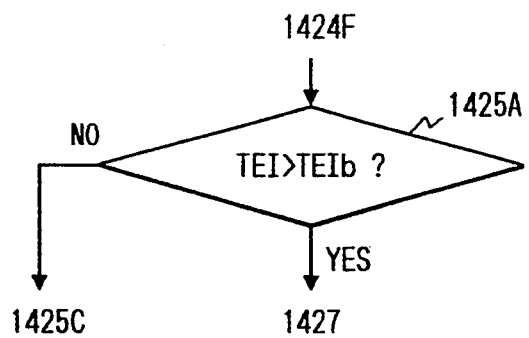
FIG. 26(c)(1)  FIG. 26(c)(2)  FIG. 26(c)(3)
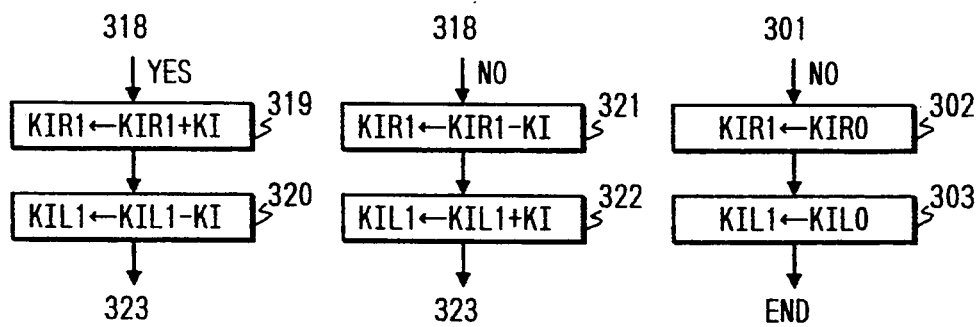
FIG. 26(d)(1)  FIG. 26(d)(2)  FIG. 26(d)(3)
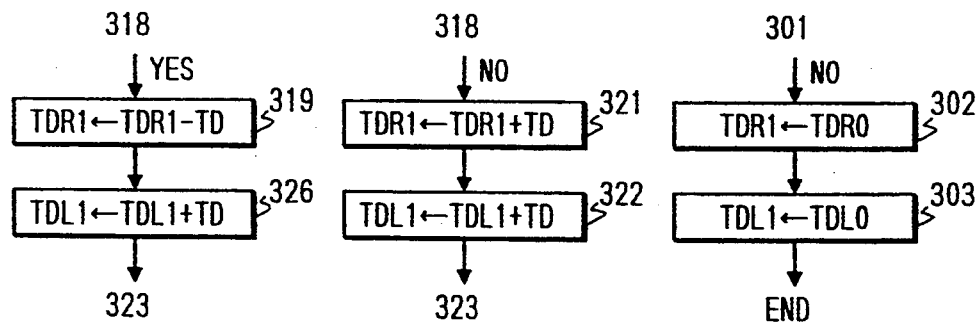

CATALYTIC CONVERTER DETERIORATION DETECTING SYSTEM FOR ENGINE

BACKGROUND OF THE INVENTION

1. Field of the Invention

The present invention relates to a system for detecting deterioration of a catalytic converter which is disposed in an exhaust system of an engine for purifying exhaust gas discharged from engine cylinders.

2. Description of the Prior Art

In a system including oxygen concentration sensors (hereinafter referred to as "$O_2$ sensors") upstream and downstream of a catalytic converter, it has been known that a period of an output signal of the downstream-side $O_2$ sensor becomes greater than that of the upstream-side $O_2$ sensor due to a so-called storage effect of the catalytic converter under a normal condition of the catalytic converter. It has been also known that, when the catalytic converter is deteriorated to lower its storage effect, a period of an output signal of the downstream-side $O_2$ sensor becomes smaller so as to be substantially the same as that of the upstream-side $O_2$ sensor, and that an amplitude of the output signal of the downstream-side $O_2$ sensor becomes greater when compared to that under the normal condition of the catalytic converter.

In consideration of this, there has been proposed a system for detecting deterioration of the catalytic converter as disclosed, such as, in Japanese Unexamined Patent Publication (Kokai) No. 61-286550 which corresponds to U.S. Pat. No. 4,739,614.

Specifically, in this conventional system, a ratio of a period of an output signal V1 of the upstream-side $O_2$ sensor to a period of an output signal V2 of the downstream-side $O_2$ sensor is derived. The system determines that the catalytic converter is deteriorated when this derived ratio becomes greater than a predetermined value or when an amplitude of the output signal V2 of the downstream-side $O_2$ sensor exceeds a predetermined value.

However, in the foregoing conventional system, when an output characteristic of the upstream-side $O_2$ sensor is deteriorated to cause a response delay, the period of the output signal V1 of the upstream-side $O_2$ sensor becomes greater so that the output signal V2 of the downstream-side $O_2$ sensor is inverted between rich and lean sides with respect to a stoichiometric air-fuel ratio indicative value or a comparison voltage VR2 at the same period as that of the upstream-side $O_2$ sensor, as shown in FIG. 6(a). As a result, the above-noted ratio between the periods of the output signals of the upstream-side and downstream-side $O_2$ sensors becomes larger so that the system determines the deterioration of the catalytic converter even when the catalytic converter is working normally.

Further, as shown in FIG. 6(b), when the upstream-side $O_2$ sensor is deteriorated, an amplitude W2 of an air-fuel ratio correction coefficient FAF which is determined based on the output V1 of the deteriorated upstream-side $O_2$ sensor becomes greater than an amplitude W1 of an air-fuel ratio correction coefficient $FAF_1$ which is determined based on the output V1 of the normal upstream-side $O_2$ sensor as shown in FIG. 5(b). As a result, an air-fuel ratio of an air-fuel mixture which is derived based on the coefficient FAF largely fluctuates so that an amplitude of the output signal V2 of the downstream-side $O_2$ sensor also increases depending on increment of a fluctuation width of the air-fuel ratio. This means that the amplitude of the output signal V2 of the downstream-side $O_2$ sensor increases as the period of the output signal V1 of the upstream-side $O_2$ sensor increases. For this reason, in the conventional system which determines the deterioration of the catalytic converter when the amplitude of the output signal V2 of the downstream-side $O_2$ sensor exceeds the predetermined value, the increment of the amplitude of the output signal V2 of the downstream-side $O_2$ sensor due to the deterioration of the upstream-side $O_2$ sensor is erroneously determined as having been caused by the deterioration of the catalytic converter.

In order to overcome the foregoing disadvantages, there has been proposed a catalytic converter deterioration detecting system of another type as disclosed, such as, in Japanese Unexamined Patent Publication (Kokai) No. 3-134241.

Specifically, in this conventional system, a variation amount during a predetermined time period of an auxiliary air-fuel ratio correction coefficient which is derived based on the output of the downstream-side $O_2$ sensor, is calculated. The system determines the deterioration of the catalytic converter when this variation amount is below a predetermined value.

However, in this proposed system, the variation amount for the given time period of the auxiliary air-fuel ratio correction coefficient largely changes depending on an updating amount per correction of the auxiliary air-fuel ratio correction coefficient. Further, this variation amount largely differs depending on which of air-fuel ratio feedback control constants is used as the auxiliary air-fuel ratio correction coefficient among a skip mount, an integral mount and a delay time. Still further, these auxiliary air-fuel ratio correction coefficients are set to various different values depending on types of the engines. Accordingly, criteria for determining the deterioration of the catalytic converter should be precisely adapted to respective auxiliary air-fuel ratio correction coefficients. In addition, since the updating amount of the auxiliary air-fuel ratio correction coefficient is not determined in consideration of detecting the deterioration of the catalytic converter, the detection accuracy of the catalytic converter deterioration can not be ensured.

SUMMARY OF THE INVENTION

Therefore, it is an object of the present invention to provide an improved catalytic converter deterioration detecting system for an engine that can eliminate one or more of the disadvantages inherent in the conventional catalytic converter deterioration detecting system.

To accomplish the above-mentioned and other objects, according to one aspect of the present invention, a system for an engine comprises a catalytic converter, provided in an exhaust system of the engine, for purifying exhaust gas discharged from the engine; an upstream-side oxygen sensor, provided upstream of the catalytic converter, for detecting whether an air-fuel ratio of an air-fuel mixture is rich or lean with respect to a stoichiometric air-fuel ratio, based on the exhaust gas upstream of the catalytic converter; a downstream-side oxygen sensor, provided downstream of the catalytic converter, for detecting whether an air-fuel ratio of the air-fuel mixture is rich or lean with respect to the stoichiometric air-fuel ratio, based on the exhaust gas having passed through the catalytic converter; means for deriving a main air-fuel ratio correction coefficient based on an output of the upstream-side oxygen sensor, the main air-fuel ratio correction coefficient being derived for correcting an air-fuel ratio of an air-fuel mixture to be fed to the engine so as to be near the stoichiometric air-fuel ratio; engine control means for controlling the air-fuel ratio of the air-fuel mixture to be fed to the engine so as to be near the stoichiometric air-fuel ratio, using the main air-fuel ratio correction coefficient; means for deriving a low-frequency component in an output of the downstream-side oxygen sensor; and means for detecting deterioration of the catalytic converter based on the low-frequency component.

According to another aspect of the present invention, a system for an engine comprises a catalytic converter, provided in an exhaust system of the engine, for purifying exhaust gas discharged from the engine; an upstream-side oxygen sensor, provided upstream of the catalytic converter, for detecting whether an air-fuel ratio of an air-fuel mixture is rich or lean with respect to a stoichiometric air-fuel ratio, based on the exhaust gas upstream of the catalytic converter; a downstream-side oxygen sensor, provided downstream of the catalytic converter, for detecting whether an air-fuel ratio of the air-fuel mixture is rich or lean with respect to the stoichiometric air-fuel ratio, based on the exhaust gas having passed through the catalytic converter; means for deriving a main air-fuel ratio correction coefficient based on an output of the upstream-side oxygen sensor, the main air-fuel ratio correction coefficient being derived for correcting an air-fuel ratio of an air-fuel mixture to be fed to the engine so as to be near the stoichiometric air-fuel ratio; engine control means for controlling the air-fuel ratio of the air-fuel mixture to be fed to the engine so as to be near the stoichiometric air-fuel ratio, using the main air-fuel ratio correction coefficient; means for deriving a high-frequency amplitude of an output of the downstream-side oxygen sensor; means for deriving a low-frequency amplitude of the output of the downstream-side oxygen sensor; and means for detecting deterioration of the catalytic converter based on the high-frequency amplitude and the low-frequency amplitude.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIGS. 2(a)(1) to 2(c), (2), (b) and (c) are time charts showing a relationship between waveforms of outputs of upstream-side and downstream-side $O_2$ sensors for a particular purification rate of a three way catalytic converter;

FIG. 3 is a diagram showing a catalytic converter deteriorated region and a catalytic converter normal region in terms of a low-frequency amplitude and a high-frequency amplitude of the output of the downstream-side $O_2$ sensor;

FIGS. 5(a) to 5(c) are time charts showing waveforms of the outputs of the upstream-side and downstream-side $O_2$ sensors and of a main air-fuel ratio correction coefficient when the upstream-side $O_2$ sensor is normal;

FIGS. 6(a) to 6(c) are time charts showing waveforms of the outputs of the upstream-side and downstream-side $O_2$ sensors and of the main air-fuel ratio correction coefficient when the upstream-side $O_2$ sensor is deteriorated;

FIGS. 8(a) to 8(e) are time charts for showing waveforms of the outputs of the downstream-side $O_2$ sensor when the catalytic converter is normal and deteriorated;

FIGS. 18(a) to 18(f) are time charts for explaining how to change an auxiliary air-fuel ratio correction coefficient;

FIGS. 21(a)(1), to 21(c)(2) are time charts showing a relationship between waveforms of the auxiliary air-fuel ratio correction coefficient and the output of the downstream-side $O_2$ sensor for a particular purification rate of the catalytic converter;

FIGS. 26(a) and (b) are flowcharts showing a modification of the flowcharts in FIGS. 25(a) and (b), and FIGS. 26(c)(1) to 26(c)(3) and 26(d)(1) to 26(d)(3) are flowcharts each showing a modification of the flowchart in FIG. 12.

DESCRIPTION OF THE PREFERRED EMBODIMENT

Now, preferred embodiments of the present invention will be described hereinbelow with reference to the accompanying drawings, wherein the present invention is applied to a vehicular internal combustion engine.

Figure 1:
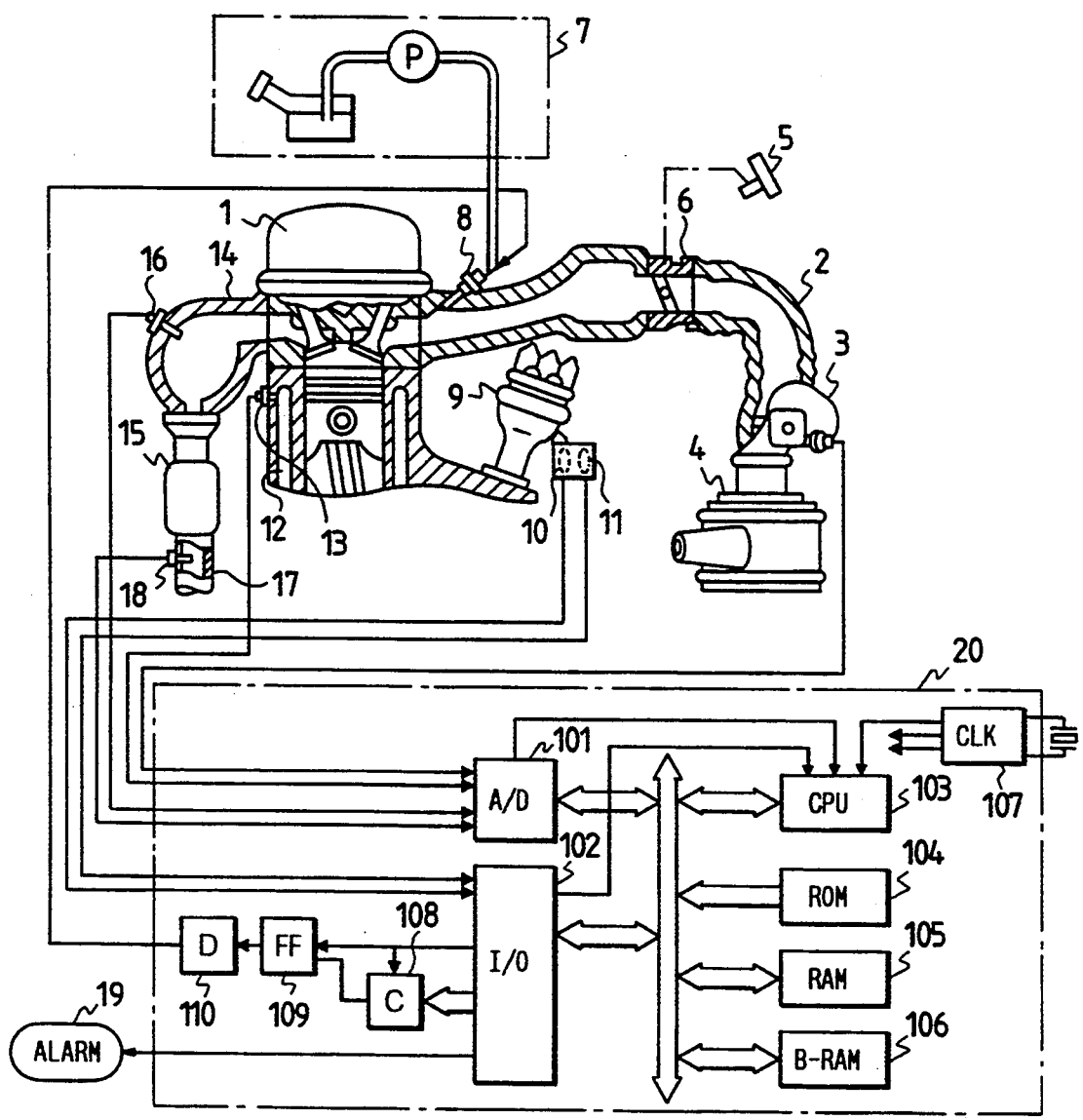
FIG. 1 is a schematic structural diagram illustrating a first preferred embodiment of the present invention.

FIG. 1 is a schematic structural diagram illustrating a first preferred embodiment of the present invention.

In FIG. 1, an airflow meter 3 is disposed in an intake passage 2 of an internal combustion engine 1. The airflow meter 3 directly measures an intake air amount Q introduced via an air cleaner 4 to the engine 1. A throttle valve 6 is further arranged in the intake passage 2. The throttle valve 6 changes its opening degree depending on a position of an accelerator 5 operated by a driver so as to adjust the intake air amount Q to be supplied to the engine 1. A fuel injection valve 8 is provided downstream of the throttle valve 6 for each cylinder of the engine 1 so that the intake air is mixed with a pressurized fuel fed from a fuel feeding system 7 via the fuel injection valve 8 to form an air-fuel mixture of a given air-fuel ratio, which is then fed to the corresponding engine cylinder via an intake port thereof.

A reference position sensor 10 and a crank angle sensor 11 are arranged in a distributor 9. The reference position sensor 10 produces a reference position detection signal per 720° CA (crank angle), and the crank angle sensor 11 produces a crank angle detection signal per 30° CA. Further, a coolant temperature sensor 13 is mounted to a water jacket 12 of a cylinder block of the engine 1 for detecting an engine coolant temperature Thw.

In an exhaust system of the engine 1, a three way catalytic converter 15 is provided downstream of an exhaust manifold 14 for simultaneously purifying harmful components HC, CO and NOx contained in the exhaust gas. At a joining portion of the exhaust manifold 14, i.e. upstream of the three way catalytic converter 15, an upstream-side $O_2$ sensor 16 is provided for monitoring an oxygen concentration in the exhaust gas on the upstream side of the three way catalytic converter 15. On the other hand, in an exhaust pipe 17 downstream of the three way catalytic converter 15, a downstream-side $O_2$ sensor 18 is provided for monitoring an oxygen concentration in the exhaust gas on the downstream side of the three way catalytic converter 15. As is well known, these $O_2$ sensors 16, 18 each produce an output voltage which differs depending on whether the air-fuel ratio is rich or lean with respect to the stoichiometric air-fuel ratio.

Numeral 19 represents an alarm for giving an alarm to the driver when an electronic control unit (ECU) 20 determines that the three way catalytic converter 15 is deteriorated, which will be described later in detail.

The ECU 20 may be formed by, for example, a microcomputer, and includes known elements, such as, an analog-to-digital (A/D) converter 101, an input/output (I/O) port 102, a central processing unit (CPU) 103, a read-only memory (ROM) 104, a random access memory (RAM) 105, a backup RAM 106 and a clock generator 107.

The ECU 20 derives a basic fuel injection amount based on an intake air mount Q monitored by the airflow meter 3 and an engine speed NE monitored by the crank angle sensor 11. The ECU 20 corrects this basic fuel injection mount based on the output signals from the upstream-side and downstream-side $O_2$ sensors 16, 18 so as to set a fuel injection mount TAU such that a purification rate of the three way catalytic converter 15 becomes maximum. A control signal representing the fuel injection amount TAU is fed to the corresponding fuel injection valve 8 via the I/O port 102.

Specifically, the ECU 20 includes a down counter 108, a flip-flop 109 and a drive circuit 110 for controlling operations of the fuel injection valves 8. When the fuel injection amount TAU is derived in a later-described routine, the fuel injection amount TAU is preset in the down counter 108, and simultaneously, the flip-flop 109 is set. As a result, the drive circuit 110 starts activation of the corresponding fuel injection valve 8. Subsequently, the down counter 108 counts up clock signals from the clock generator 107. When a carry-out terminal of the down counter 108 finally becomes a logic level "1", the flip-flop 109 is reset so that the drive circuit 110 stops the activation of the corresponding fuel injection valve 8. Thus, the fuel injection valve 8 is activated during a time period corresponding to the fuel injection amount TAU so that an amount of the fuel corresponding to the fuel injection amount TAU is injected via the fuel injection valve 8 to be fed to the corresponding cylinder of the engine 1.

Now, referring to FIG. 2, the concept of detecting the deterioration of the three way catalytic converter 15 employed in the preferred embodiments of the present invention will be described hereinbelow.

FIGS. 2(a)(1) to 2(c)(2) are time charts showing a relationship between a purification rate of the three way catalytic converter 15 for HC and a waveform of an output V2 of the downstream-side $O_2$ sensor 18 with illustration of a waveform of an output V1 of the upstream-side $O_2$ sensor 16 for reference. In FIGS. 2(a)(1) to 2(c)(2), dashed lines indicated on the waveforms of the outputs V2 of the downstream-side $O_2$ sensor each represent movement of a low-frequency component of the output V2 of the downstream-side $O_2$ sensor 18 which is generated due to an auxiliary air-fuel ratio feedback control. As shown in FIGS. 2(a)(1) and 2(a)(2), when the purification rate of the three way catalytic converter 15 is high, i.e. 75% in FIG. 2(a)(1) and 2(a)(2), an amplitude of a high-frequency component (hereinafter referred to as "high-frequency amplitude") of the output V2 is small, while an amplitude of the low-frequency component (hereinafter referred to as "low-frequency amplitude") of the output V2 is large. FIGS. 2(a)(1) and 2(a)(2) depict an HC purification rate of 75%, FIGS. 2(b)(1) and 2(b)(2) a purification rate of 40%, and FIGS. 2(c)(1) and (c)(2) a purification rate of 20%. As appreciated from FIGS. 2(a)(1) to 2(c)(2), as a deterioration degree of the three way catalytic converter 15 advances, i.e. as the purification rate of the three way catalytic converter 15 is reduced (75%→40%→20%), the high-frequency amplitude becomes larger and the low-frequency amplitude becomes smaller.

The first preferred embodiment makes use of the above-noted characteristics of the variation of the high-frequency amplitude and the low-frequency amplitude. Specifically, the first preferred embodiment detects the high-frequency amplitude and the low-frequency amplitude so as to precisely detect the deterioration of catalytic converter based on both of the detected high-frequency and low-frequency amplitudes, that is, the deterioration of the catalytic converter is determined when the high-frequency amplitude of the output V2 of the downstream-side $O_2$ sensor 18 is large and the low-frequency amplitude thereof is small.

FIG. 3 is a diagram showing a regional relationship for determining the condition of the three way catalytic converter 15 based on the output V2, i.e. the high-frequency amplitude and the low-frequency amplitude. In FIG. 3, a horizontal line represents the low-frequency amplitude of the output V2 and a vertical line represents the high-frequency amplitude of the output V2. A criterion region for determining the deterioration of the three way catalytic converter 15 is shown in FIG. 3 as being hatched. Specifically, the deterioration determining criterion region is defined such that the high-frequency amplitude is greater than a predetermined value B and the low-frequency amplitude is smaller than a predetermined value C. Accordingly, when both the detected high-frequency amplitude and the detected low-frequency amplitude fall within the hatched criterion region in FIG. 3, the deterioration of the three way catalytic converter 15 is determined.

Now, the meaning of the high frequency or the high-frequency component and the low frequency or the low-frequency component will be precisely defined hereinbelow.

The high-frequency component is defined as a frequency component of the output V2 of the downstream-side $O_2$ sensor 18 which is affected by a later-described man air-fuel ratio feedback control and quickly varies at the same frequency as that of the output V1 of the upstream-side $O_2$ sensor 16. The amplitude of this high-frequency component is small when the catalytic converter is under the normal condition, while becoming larger as the deterioration of the catalytic converter advances, and finally approaching close to the amplitude of the output V1 of the upstream-side $O_2$ sensor 16. This amplitude of the output V2 of the downstream-side $O_2$ sensor 18 is defined as "high-frequency amplitude".

The low-frequency component is defined as a frequency component of the output V2 of the downstream-side $O_2$ sensor 18 which is affected by a later-described auxiliary air-fuel ratio feedback control and slowly varies at a period equal to or larger than four times the period of the output V1 of the upstream-side $O_2$ sensor 16. The amplitude of this low-frequency component decreases when particular components (such as, $O_2$ at the time of the output V2 being on the rich side and $H_2$ at the time of the output V2 being on the lean side) in the exhaust gas, which can not be purified due to the deterioration of the catalytic converter, increases. This means that the amplitude of this low-frequency component is large when the purification rate of the catalytic converter is high, while becoming smaller as the purification rate of the catalytic converter decreases. This amplitude of the output V2 of the downstream-side $O_2$ sensor 18 is defined as "low-frequency amplitude".

Figure 4:
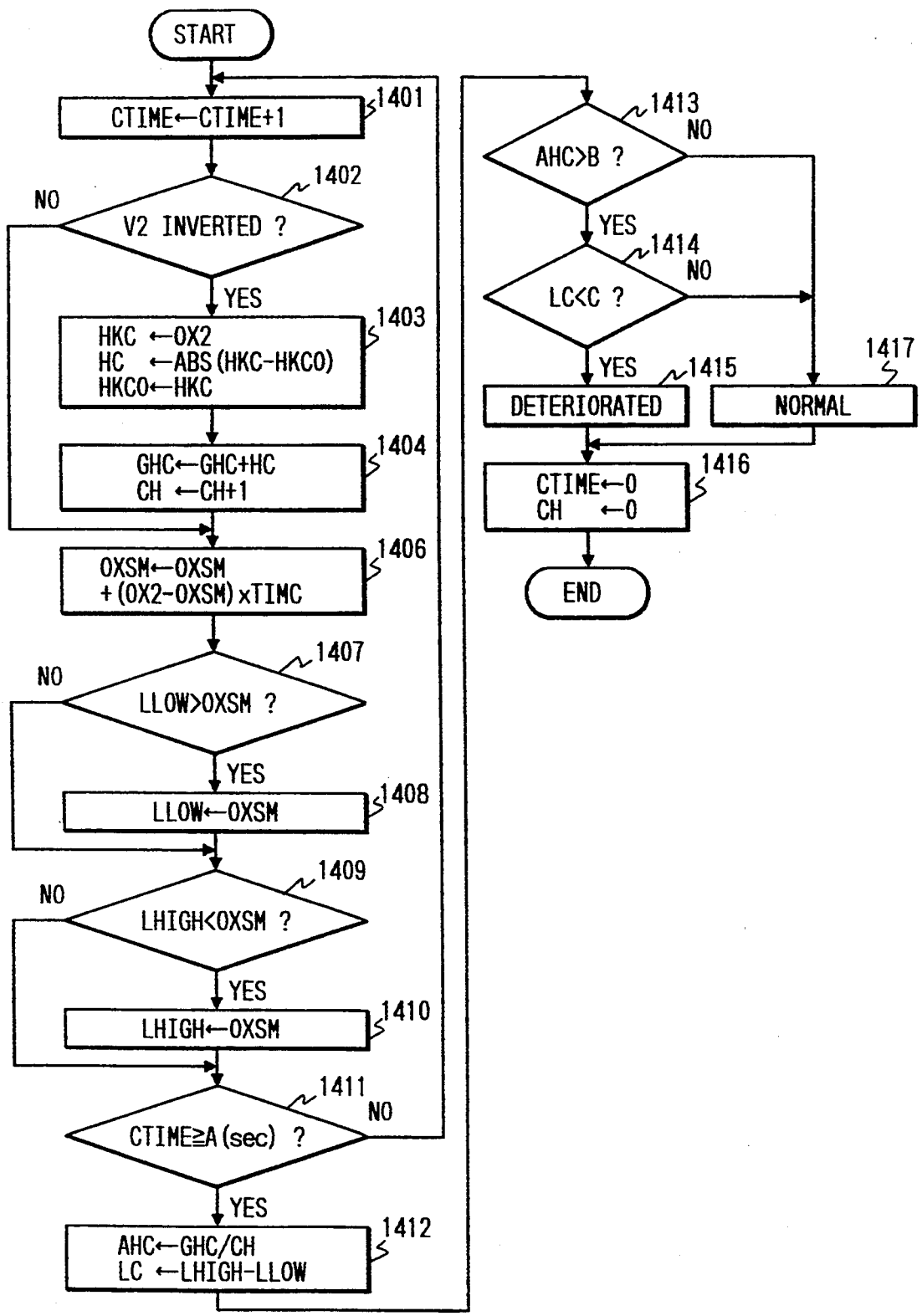
FIG. 4 is a flowchart showing a routine for detecting deterioration of the catalytic converter according to the first preferred embodiment.

FIG. 4 is a flowchart showing a routine for detecting the deterioration of the three way catalytic converter 15. This routine is executed by the CPU 103 at every given timing, such as, per 64 msec. during the air-fuel ratio feedback control including the main and auxiliary air-fuel ratio feedback controls.

At a first step 1401, a detection time counter CTIME is incremented by "1". The routine then proceeds to a step 1402 which determines whether the output V2 of the downstream-side $O_2$ sensor 18 has been inverted from its increasing side to its decreasing side or from its decreasing side to its increasing side, i.e. whether a varying direction of the output V2 has been inverted from increasing to decreasing or from decreasing to increasing. Specifically, the step 1402 reads out a value $OX_2$ of the output V2 per execution thereof and compares a last value $OX_2$ of the output V2 and a current value $OX_2$ thereof for determining whether or not the output V2 has been inverted so as to detect a peak value of the high-frequency component. As appreciated, if the output V2 has been inverted as determined at the step 1402, then the last value $OX_2$ of the output V2 is determined as the peak value.

When the result of step 1402 is positive, i.e. the output V2 has been inverted, the routine proceeds to a step 1403 where the last value $OX_2$ is set as a current peak value HKC of the high-frequency component (HKC←$OX_2$). The step 1403 further derives an absolute value of a difference between the current peak value HKC and a last peak value HKCO and sets this absolute value as a high-frequency amplitude HC (HC←ABS(HKC−HKCO). Further, the step 1403 sets the current peak value HCK as the last peak value HKCO for a next calculation of the absolute value ABS(HKC−HKCO).

Subsequently, the routine proceeds to a step 1404 where a current accumulated value GHC is derived by adding the current high-frequency amplitude HC to a last accumulated value GHC (GHC→GHC+HC), and an inversion time accumulating counter CH is incremented by "1". The accumulated value GHC and a value of the accumulating counter CH will be used at a later step 1412 for deriving a mean value of the high-frequency amplitudes HC.

The routine further proceeds to a step 1406 where the output V2 of the downstream-side $O_2$ sensor 18 is smoothed by a given smoothing coefficient TIMC to derive a substitute value OXSM which is a substitution for a value of the low-frequency component of the output V2 (OXSM←OXSM+($OX_2$−OXSM)×TIMC). Thereafter, through steps 1407 to 1410, a minimum value LLOW of the value OXSM and a maximum value LHIGH of the value OXSM are derived. These minimum and maximum values LLOW and LHIGH will be used at the later step 1412 for deriving a low-frequency amplitude LC.

The routine now proceeds to a step 1411 which determines whether a value of the detection time counter CTIME is equal to or greater than a preset time period A, such as, 29 sec., i.e. whether a detection time period has reached the preset time period A. If the value of the detection time counter CTIME is less than the preset time period A, the routine returns to the step 1401. On the other hand, if the value of the detection time counter CTIME is equal to or greater than the preset time period A, the routine proceeds to the step 1412 which derives the mean value AHC of the high-frequency amplitudes GHC by dividing the current accumulated value GHC derived at the step 1404 by the value of the inversion time accumulating counter CH incremented at the step 1404. The step 1412 further derives the low-frequency amplitude LC by subtracting the minimum value LLOW derived through the steps 1407 and 1408 from the maximum value LHIGH derived through the steps 1409 and 1410.

Subsequently, a step 1413 determines whether the high-frequency amplitude mean value AHC is larger than a preset value B. If the step 1413 determines that the mean value AHC is larger than the preset value B, the routine proceeds to a step 1414 which determines whether the low-frequency amplitude LC is smaller than a preset value C. If the step 1414 determines that the low-frequency amplitude LC is smaller than the preset value C, a step 1415 determines that the three way catalytic converter 15 is deteriorated, so as to activate the alarm 19. On the other hand, when the step 1413 determines that the high-frequency amplitude mean value AHC is equal to or less than the preset value B or when the step 1414 determines that the low-frequency amplitude LC is equal to or greater than the preset value C, a step 1417 determines that the three way catalytic converter 15 is normal. From the step 1415 or 1417, the routine proceeds to a step 1416 where the detection time counter CTIME and the inversion time accumulating counter CH are respectively reset to 0 (zero), and is terminated.

Figure 7:
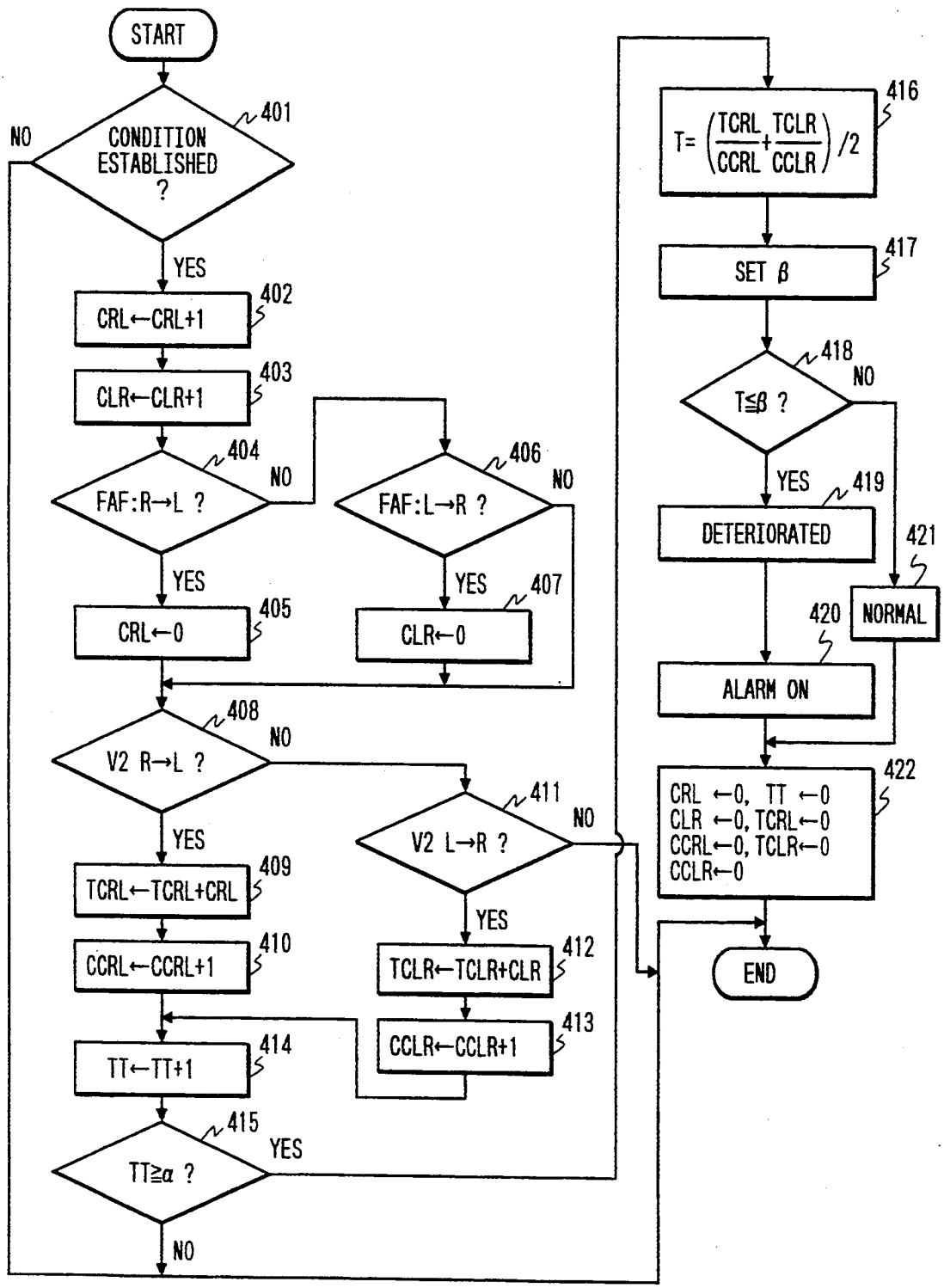
FIG. 7 is a flowchart of a routine for detecting deterioration of the catalytic converter according to the first preferred embodiment.

When the step 1417 determines that the three way catalytic converter 15 is In the normal condition, a routine represented by a flowchart in FIG. 7 is executed for double-checking the detection of the deterioration of the three way catalytic converter 15.

The routine of FIG. 7 is executed at every given timing, such as, per 64 msec.

At a first step 401, it is determined whether a condition for detecting the deterioration of the three way catalytic converter 15 is established. This detection condition is determined to be established when, for example, the following conditions are satisfied in case the step 1417 determines that the three way catalytic converter 15 is normally working:

(1) the main and auxiliary air-fuel ratio feedback controls are being executed;
(2) a man air-fuel ratio correction coefficient FAF and auxiliary air-fuel ratio correction coefficients, i.e. a rich skip mount RSR1 and a lean skip mount RSL1 are not guard values, respectively;
(3) the engine 1 is under the steady driving condition.

When the step 401 determines that the detecting condition is not established, the routine is terminated.

On the other hand, when the detecting condition is established as determined at the step 401, the routine proceeds to a step 402 where a counter CRL is incremented by "1", and further to a step 403 where a counter CLR is incremented by "1". A value of the counter CRL corresponds to an elapsed time from a time point when the main air-fuel ratio correction coefficient FAF is changed in a skipped manner from its rich correction side to its lean correction side. On the other hand, a value of the counter CLR corresponds to an elapsed time from a time point when the main correction coefficient FAF is changed in a skipped manner from its lean correction side to its rich correction side.

FIG. 8(a) to 8(e) are time charts showing a relationship among the output V1 of the upstream-side $O_2$ sensor 16, the main correction coefficient FAF, the output V2 of the downstream-side $O_2$ sensor 18 when the catalytic converter 15 is normal, operations of the counters CRL and CLR and the output V2 of the downstream-side $O_2$ sensor 18 when the catalytic converter 15 is deteriorated. As seen in FIG. 8(a) to 8(c), when the main correction coefficient FAF is changed in a skipped manner from its rich correction side to its lean correction side and from its lean correction side to its rich correction side, the output V2 crosses a comparison voltage VR2 from rich to lean and from lean to rich with respective delay times T1 and T2 when the catalytic converter 15 is working in the normal condition.

Specifically, when the catalytic converter 15 is normal, an air-fuel ratio variation caused by the change of the main correction coefficient FAF is reflected on the output V2 with a certain delay due to the storage effect of the catalytic converter 15. On the other hand, when the catalytic converter is deteriorated to reduce its storage effect, the output V2 changes with delay times T1X and T2X which are respectively smaller than the delay times T1 and T2 caused under the normal condition of the catalytic converter 15. Accordingly, in this preferred embodiment, the counter CRL counts the delay time T1 (T1X) from a time point when the main correction coefficient FAF is changed from its rich correction side to its lean correction side to a time point when the output V2 decreases to cross the comparison voltage VR2. On the other hand, the counter CLR counts the delay time T2 (T2X) from a time point when the main correction coefficient FAF is changed from its lean correction side to its rich correction side to a time point when the output V2 increases to cross the comparison voltage VR2. The delay times T1 (T1X) and T2 (T2X) are respectively accumulated until a total number of times of the accumulation of the delay times T1 (T1X) and T2 (T2X) reaches a given number $a$, for example, a value of "ten", so as to calculate a mean value of the delay Limes T1 (T1X) and T2 (T2X). Based on this mean value, it is determined whether the catalytic converter 15 is deteriorated.

Specifically, referring back to FIG. 7, after execution of the steps 402 and 403, the routine proceeds to a step 404 which determines whether the main correction coefficient FAF has been changed or inverted from its rich correction side to its lean correction side in a skipped manner, i.e. whether the main correction coefficient FAF has been inverted from its rich correction side (FAF>1) to its lean correction side (FAF<1) with respect to a value "1" When the step 404 determines the inversion of the coefficient FAF from its rich correction side to its lean correction side, a step 405 resets the counter CRL to 0 (zero). Subsequently, a step 408 determines whether the output V2 has been changed or inverted from rich (V2>VR2) to lean (V2<VR2) with respect to the comparison voltage VR2. If the step 408 determines that the output V2 has been inverted from rich to lean, the routine proceeds to a step 409 where a current value of the counter CRL corresponding to the delay time T1 (T1X) is added to an accumulating counter TCRL (TCRL←TCRL+CRL).

Subsequently, at a step 410, an accumulation time counter CCRL is incremented by "1" (CCRL←CCRL+1). A value of the accumulation time counter CCRL represents the number of times of the accumulation of the values of the counter CRL, i.e. of the delay times T1 (T1X). The routine now proceeds to a step 414 where an execution accumulating counter TT is incremented by "1" (TT←TT+1). A value of the execution accumulating counter TT represents a total number of times of the accumulation of the counter values CRL (T1, T1X) executed at the step 409 and of accumulation of values of the counter CLR executed at a later-described step 412. As appreciated, the value of the counter CLR represents the delay time T2 (T2X). Thereafter, a step 415 determines whether the value of the counter Tr reaches the predetermined value α. If answer at the step 415 is NO, the routine is terminated. On the other hand, if answer at the step 415 is YES, , i.e. the value of the counter Tr has reached the predetermined value α, the routine executes subsequent steps 416 to 422.

Referring back to the step 404, when it is determined that the main correction coefficient FAF has not been inverted, the routine proceeds to a step 406 which checks whether the coefficient FAF has been changed from its lean correction side (FAF<1) to its rich correction side (FAF>1) with respect to a value If the step 406 determines the inversion of the coefficient FAF from its lean correction side to its rich correction side, a step 407 resets the counter CLR to 0 (zero). Thereafter, the routine proceeds to the step 408.

When the answer at the step 408 is NO, i.e. the output V2 has not been changed from rich to lean, the routine proceeds to a step 411 which determines whether the output V2 has been changed from lean (V2<VR2) to rich (V2>VR2) with respect to the comparison voltage VR2. If the step 411 determines that the output V2 has been changed from lean to rich, the routine proceeds to a step 412 where a current value of the counter CLR corresponding to the delay time T2 (T2X) is added to an accumulating counter TCLR (TCLR←TCLR+CLR).

Subsequently, at a step 413, an accumulation time counter CCLR is incremented by "1" (CCLR←CCLR+1). A value of the accumulation time counter CCLR represents the number of times of the accumulation of the values of the counter CLR, i.e. of the delay times T2 (T2X). The routine then proceeds to the step 414.

On the other hand, if answer at the step 406 is NO, i.e. the main correction coefficient FAF is not at inversion between rich and lean, the routine proceeds to the step 408 so that neither of the counters CRL and CLR are reset. Further, when answers at the steps 408 and 411 both are NO, the routine is terminated. This means that, when neither of the main correction coefficient FAF and the output V2 are at inversion between rich and lean, the routine only updates the counters CRL and CLR.

Referring back to the step 416, this step derives a mean value T of the delay times T1 (T1X) and T2 (T2X) based on the following equation:

$$T = (TCRL/CCRL + TCLR/CCLR)/2$$

In the equation, TCRL/CCRL represents a mean value of the delay times T1 (T1X), and TCLR/CCLR represents a mean value of the delay times T2 (T2X). Accordingly, the value T derived by dividing a sum of such two mean values by a value "2" represents a mean value of the delay times T1 (T1X) and T2 (T2X).

Figure 9:
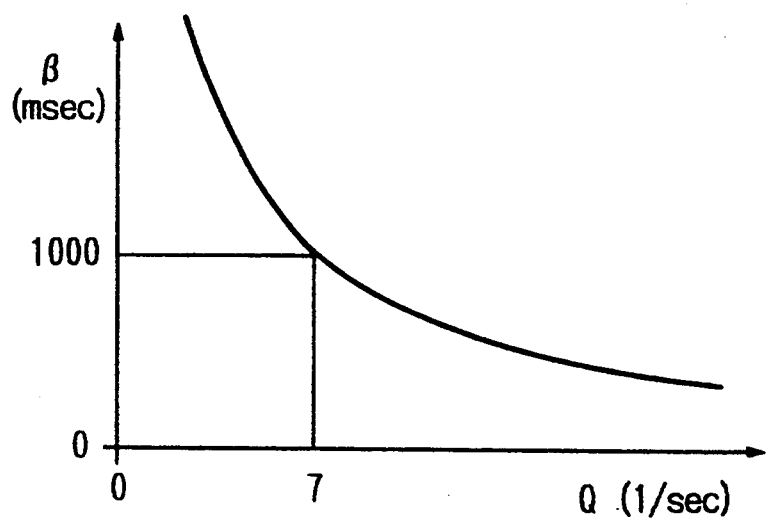
FIG. 9 is a characteristic map showing a relationship between a deterioration determining level $\beta$ and an intake air amount Q.

Subsequently, a deterioration determining level β is set at the step 417 using a characteristic map of FIG. 9. As shown in FIG. 9, the deterioration determining level β is defined relative to an intake air amount Q such that the deterioration determining level β decreases as the intake air amount Q increases. The routine now proceeds to the step 418 which compares the mean value T with the deterioration determining level β. When the mean value T is equal to or smaller than the level β, the step 419 determines that the catalytic converter 15 is deteriorated. Then, the routine proceeds to the step 420 which activates the alarm 19, and further to the step 422. On the other hand, when the mean value T is larger than the level β as determined at the step 418, the routine proceeds to the step 421 which determines that the catalytic converter 15 is normal, and further to the step 422.

The step 422 resets the counters CRL, CLR, the accumulating counters TCRL, TCLR, the accumulation time counters CCRL, CCLR and the execution accumulating counter TT for a subsequent execution of this routine.

In the routine of FIG. 7, the mean value T is derived at the step 416 for comparison with the deterioration determining level β at the step 417. However, only the mean value of the delay times T1 (T1X) represented by TCRL/CCRL or the mean value of the delay times T2 (T2X) represented by TCLR/CCLR may be compared with the level β so as to determine the condition of the catalytic converter 15. Alternatively, it may also be arranged to compare one value of the delay time T1 (T1X) or T2 (T2X) with the level β so as to determine the condition of the catalytic converter 15. Further, it may also be arranged that the step 416 is executed at every given timing, such as, per 640 msec. instead of when the value of the counter TT reaches the given number α at the step 415. Still further, the deterioration determining level β may be set to a fixed value, such as, 1 sec.

Figure 10:
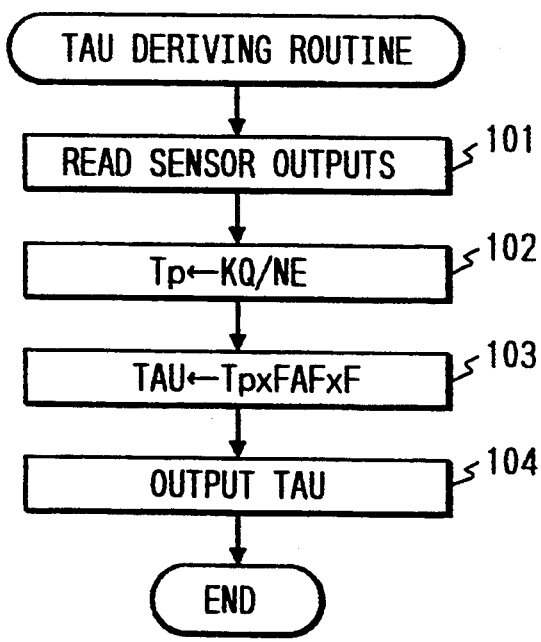
FIG. 10 is a flowchart showing a routine for deriving a fuel injection amount according to the first preferred embodiment.

FIG. 10 is a flowchart showing a routine for deriving a fuel injection amount TAU. This routine is executed at every given timing, such as, per 360° CA.

At a first step 101, various sensor signals indicative of, such as, the intake air amount Q and the engine speed NE are read in. A subsequent step 102 derives a basic fuel injection mount Tp based on the following equation:

$$Tp \leftarrow K \cdot Q/NE$$

wherein, K is a constant.

Subsequently, a step 103 derives the fuel injection amount TAU based on the following equation:

$$TAU \leftarrow Tp \cdot FAF \cdot F$$

wherein, FAF is the main air-fuel ratio correction coefficient derived in the air-fuel ratio feedback control and F is a correction coefficient representing various known correction amounts.

Then, the routine proceeds to a step 104 which outputs the control signal corresponding to the fuel injection amount TAU to the corresponding fuel injection valve 8.

Figure 11:
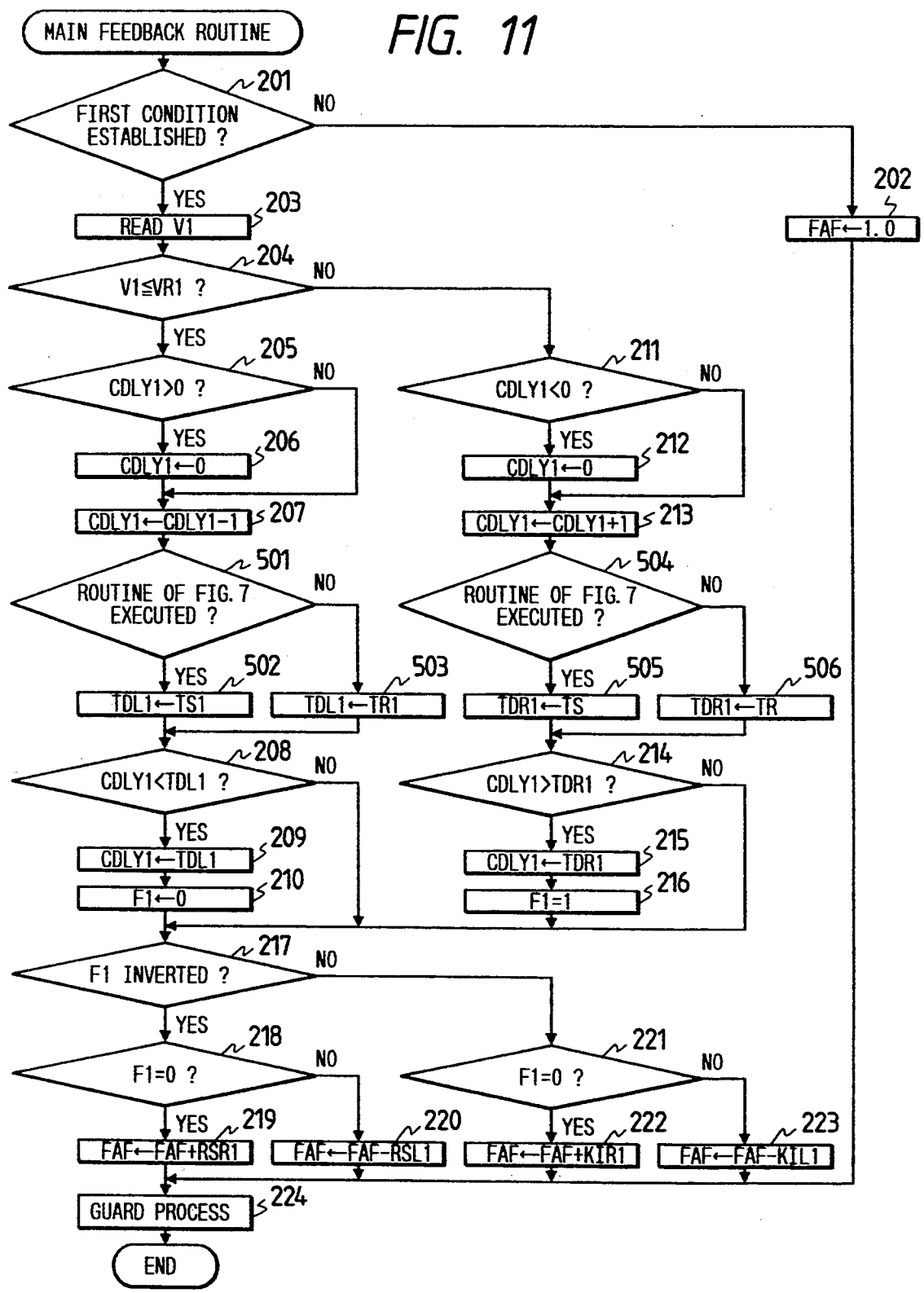
FIG. 11 is a flowchart showing a routine of a main air-fuel ratio feedback control according to the first preferred embodiment.

Now, referring to FIG. 11, a routine of the main air-fuel ratio feedback control will be described hereinbelow. This routine is executed at every given timing, such as, per 4 msec. for deriving the main correction coefficient FAF based on the output V1 of the upstream-side O₂ sensor 16.

At a first step 201, it is determined whether an executing condition for the main air-fuel ratio feedback control (hereinafter referred to as "first executing condition") is established. The first executing condition is determined to be established, for example, when the engine has finished its start-up state and when the upstream-side $O_2$ sensor 16 is activated. If the step 201 produces a negative answer, the routine proceeds to a step 202 where the main correction coefficient FAF is set to a value "1.0" (FAF←1.0), and then is terminated.

On the other hand, if the step 201 determines that the first executing condition is established, the routine proceeds to a step 203 which reads out the output V1. Then, a step 204 determines whether the output V1 is equal to or smaller than the comparison voltage VR1 which is set to, for example, 0.45 V, i.e. whether the air-fuel ratio is rich or lean with respect to the stoichiometric air-fuel ratio. If the output V1 is equal to or smaller than the first comparison voltage VR1, i.e. the air-fuel ratio is lean, the routine proceeds to a step 205 which determines whether a value of a first delay counter CDLY1 is a positive value, i.e. whether the output 1 has been inverted from rich to lean. The first delay counter CDLY1 is for measuring an elapsed time from a time point when the output V1 crosses the first comparison voltage VR1. The elapsed time from a time point when the output V1 crosses the first comparison voltage VR1 from lean to rich is defined by a positive value, and the elapsed time from a time point when the output V1 crosses the first comparison voltage VR1 from rich to lean is defined by a negative value.

When the value of the first delay counter CDLY1 is a negative value at the step 205, the routine proceeds to a step 207. On the other hand, when the value of the first delay counter CDLY1 is a positive value at the step 205, the routine proceeds to a step 206 where the first delay counter CDLY1 is reset to 0 (zero), and further to the step 207.

At the step 207, the first delay counter CDLY1 is decremented by a value "1" (CDLY1←CDLY1−1). Thereafter, a step 501 determines whether the routine of FIG. 7 is executed. The step 501 makes this decision by determining whether the deterioration detecting condition is established at the step 401 in FIG. 7. When answer at the step 501 is NO, the routine proceeds to a step 503 where a first lean delay time TDL1 is set to a given value TR1. On the other hand, when the step 501 determines that the routine of FIG. 7 is executed, the routine proceeds to a step 502 where the first lean delay time TDL1 is set to a given value TS 1 which is set smaller than the given value TR1. Subsequently, a step 208 determines whether the value of the first delay counter CDLY1 is smaller than the first lean delay time TDL1. The first lean delay time TDL1 represents a counter value corresponding to a delay time in a delay process for holding the decision of the output V1 being rich even when the output V1 has been inverted from rich to lean. The first lean delay time TDL1 is defined by a negative value. Accordingly, when the first lean delay time TDL1 is set to the given value TS1 from the given value TR1 (TS1<TR1), the delay time in the delay process increases, for example, from 12 msec. to 240 msec. so that a period of the main correction coefficient FAF increases to ensure the reliable detection of the inversion of the output V2 between rich and lean at the steps 408 and 411 in FIG. 7.

Referring back to the step 208, when this step determines that the value of the first delay counter CDLY1 is equal to or greater than the first lean delay time TDL1, the routine proceeds to a step 217. On the other hand, when the step 208 determines that the value of the first delay counter CDLY1 is smaller than the first lean delay time TDL1, i.e. a time has elapsed more than the delay time in the delay process from a time point when the inversion of the output V1 from rich to lean occurred, the routine proceeds to a step 209 where the first delay counter CDLY1 is set to the first lean delay time TDL1 (CDLY1←TDL1). The routine now proceeds to a step 210 where a flag F1 is reset (F1←0). The flag F1 being "1" or "0" represents a condition of the air-fuel ratio after the delay process. Specifically, when the flag F1 is in a reset condition (F1=0), it represents that the air-fuel ratio after the delay process is lean. Then, the routine proceeds to the step 217.

Referring back to the step 204, when the output V1 is greater than the first comparison voltage VR1, i.e. the air-fuel ratio is rich, the routine proceeds to a step 211. The step 211 determines whether the value of a first delay counter CDLY1 is a negative value, i.e. whether the output 1 has been inverted from lean to rich. When the value of the first delay counter CDLY1 is a positive value at the step 211, the routine proceeds to a step 213. On the other hand, when the value of the first delay counter CDLY1 is a negative value at the step 211, the routine proceeds to a step 212 where the first delay counter CDLY1 is reset to 0 (zero), and further to the step 213.

At the step 213, the first delay counter CDLY1 is incremented by a value "1" (CDLY1←CDLY1+1). Thereafter, a step 504 determines whether the routine of FIG. 7 is executed, in the same manner as at the step 501. When answer at the step 504 is NO, the routine proceeds to a step 506 where a first rich delay time TDR1 is set to a given value TR. On the other hand, when the step 504 determines that the routine of FIG. 7 is executed, the routine proceeds to a step 505 where the first rich delay time TDR1 is set to a given value TS which is set greater than the given value TR. Subsequently, a step 214 determines whether the value of the first delay counter CDLY is greater than the first rich delay time TDR1. The first rich delay time TDR1 represents a counter value corresponding to the delay time in the delay process for holding the decision of the output V1 being lean even when the output V1 has been inverted from lean to rich. The first rich delay time TDR1 is defined by a positive value. Accordingly, when the first rich delay time TDR1 is set to the given value TS from the given value TR (TS>TR), the delay time in the delay process increases, for example, from 64 msec. to 240 msec. so that a period of the main correction coefficient FAF increases to ensure the reliable detection of the inversion of the output V2 between rich and lean at the steps 408 and 411 in FIG. 7.

Referring back to the step 214, when this step determines that the value of the first delay counter CDLY1 is equal to or smaller than the first rich delay time TDR1, the routine proceeds to the step 217. On the other hand, when the step 214 determines that the value of the first delay counter CDLY1 is greater than the first rich delay time TDR1, i.e. a time has elapsed more than the delay time in the delay process from a time point when the inversion of the output V1 from lean to rich occurred, the routine proceeds to a step 215 where the first delay counter CDLY1 is set to the first rich delay time TDR1 (CDLY1←TDR1). The routine now proceeds to a step 216 where the flag F1 is set (F1←1).

When the flag F1 is in a set condition (F1=1), it represents that the air-fuel ratio after the delay process is rich. Then, the routine proceeds to the step 217.

The step 217 determines whether the flag F1 has been inverted between "1" and "0", i.e. whether the condition of the air-fuel ratio after the delay process has been inverted between rich and lean. When answer at the step 217 is positive, i.e. the flag F1 has been inverted, the main correction coefficient FAF is corrected in a skipped manner through steps 218 to 220. Specifically, the step 218 determines whether the flag F1 is reset. When the flag F1 is reset, i.e. at the inversion from rich to lean, the routine proceeds to the step 219 where the main correction coefficient FAF is increased by a rich skip amount RSR1 as represented by the following equation:

$$FAF \leftarrow FAF + RSR1$$

On the other hand, when the flag F1 is set, i.e. at the inversion from lean to rich, the routine proceeds to the step 220 where the main correction coefficient FAF is decreased by a lean skip amount RSL1 as represented by the following equation:

$$FAF \leftarrow FAF - RSL1$$

Referring back to the step 217, when the flag F1 has not been inverted, i.e. the air-fuel ratio after the delay process has not been inverted, the main correction coefficient FAF is corrected by an integral process through steps 221 to 223. Specifically, the step 221 determines whether the flag F1 is reset, i.e. whether the air-fuel ratio after the delay process is lean. When the flag F1 is reset, the routine proceeds to the step 222 where the main correction coefficient FAF is increased by a rich integral amount KIR1 as represented by the following equation:

$$FAF \leftarrow FAF + KIR1$$

On the other hand, when the flag F1 is set at the step 221, the routine proceeds to the step 223 where the main correction coefficient FAF is decreased by a lean integral amount KIL1 as represented by the following equation:

$$FAF \leftarrow FAF - KIL1$$

From the step 219, 220, 222 or 223, the routine proceeds to a step 224 where the main correction coefficient FAF is guarded to be within a preset range, for example, $0.8 \leq FAF \leq 1.2$, and is terminated.

Figure 12:
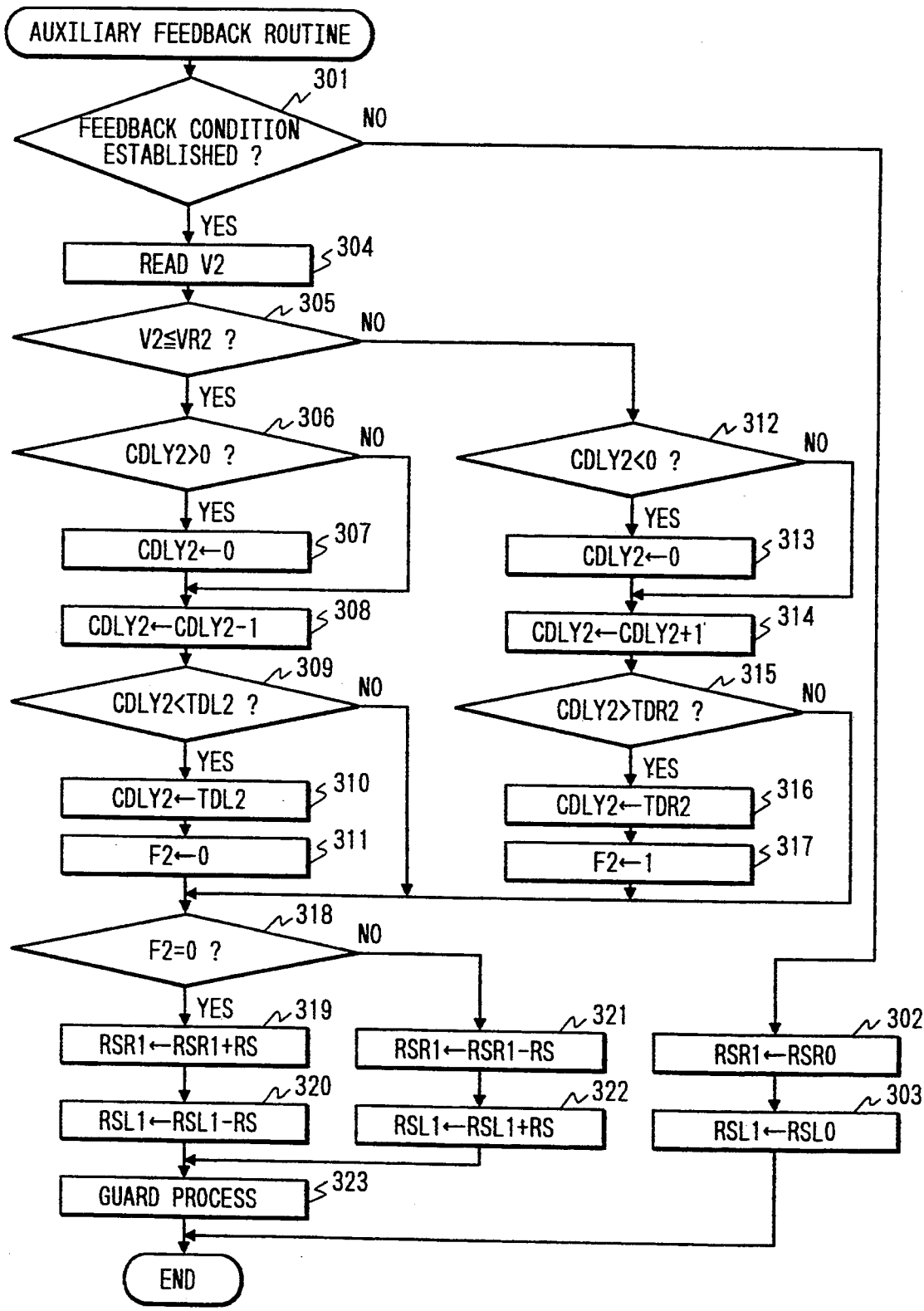
FIG. 12 is a flowchart showing a routine of an auxiliary air-fuel ratio feedback control according to the first preferred embodiment.

FIG. 12 is a flowchart showing a routine of the auxiliary air-fuel ratio feedback control. This routine is executed at every given timing, such as, per 1 sec. for correcting the rich skip amount RSR1 and the lean skip amount RSL1 in the main air-fuel ratio feedback control based on the output V2 of the downstream-side $O_2$ sensor 18.

A first step 301 determines whether an executing condition for the auxiliary air-fuel ratio feedback control (hereinafter referred to as "second executing condition") is established. The second executing condition is determined to be established, for example, when the first executing condition is established, i.e. the main air-fuel ratio feedback control is being executed and when the downstream-side $O_2$ sensor 18 is activated.

When the second executing condition is not established at the step 301, the routine proceeds to a step 302 where the rich skip amount RSR1 is set to a preset rich skip amount RSR0, and further to a step 303 where the lean skip amount RSL1 is set to a preset lean skip amount RSL0, and then is terminated.

On the other hand, when the step 301 determines that the second executing condition is established, the routine proceeds to a step 304 where the output V2 is read in. Subsequently, a step 305 determines whether the output V2 is equal to or smaller than a second comparison voltage VR2, for example, 0.45 V as the first comparison voltage VR1 in this preferred embodiment, i.e. whether the air-fuel ratio is rich or lean with respect to the stoichiometric air-fuel ratio. When the output V2 is equal to or smaller than the second comparison voltage VR2 at the step 305, i.e. the air-fuel ratio is lean, the routine proceeds to a step 306.

The step 306 determines whether a value of a second delay counter CDLY2 is positive, i.e. whether the output V2 has been inverted from rich to lean. The second delay counter CDLY2 is for measuring an elapsed time from a time point when the output V2 crosses the second comparison voltage VR2 between the rich and lean sides thereof, as the foregoing first delay counter CDLY1. The elapsed time in the rich side is defined by a positive value, while the elapsed time in the lean side is defined by a negative value.

When the value of the second delay counter CDLY2 is negative at the step 306, the routine proceeds to a step 308. On the other hand, when the value of the second delay counter CDLY2 is positive at the step 306, the routine proceeds to a step 307 where the second delay counter CDLY2 is reset (CDLY2←0), and further to the step 308. At the step 308, the second delay counter CDLY2 is decremented by a value "1" (CDLY2←CDLY2−1). Subsequently, a step 309 determines whether the value of the second delay counter CDLY2 is smaller than a second lean delay time TDL2. The second lean delay time TDL2 represents a counter value corresponding to a delay time in a delay process for holding the decision of the output V2 being rich even when the output V2 has been inverted from rich to lean. The second learn delay time TDL2 is defined by a negative value. When the value of the second delay counter CDLY2 is equal to or greater than the second lean delay time TDL2 at the step 309, the routine proceeds to a step 318. On the other hand, when the value of the second delay counter CDLY2 is smaller than the second lean delay time TDL2, i.e. a time has elapsed more than the delay time in the delay process from a time point of the inversion of the output V2 from rich to lean, the routine proceeds to a step 310. At the step 310, the second delay counter CDLY2 is set to the second lean delay time TDL2 (CDLY2←TDL2). Subsequently, a step 311 resets a flag F2 (F2←0). The flag F2 represents a condition of the air-fuel ratio after the delay process. When the flag F2 is in a reset condition (F2=0), it represents that the air-fuel ratio after the delay process is lean. The routine then proceeds to the step 318.

Referring back to the step 305, when the output V2 is greater than the second comparison voltage VR2, i.e. the air-fuel ratio is rich, the routine proceeds to a step 312. The step 312 determines whether a value of the second delay counter CDLY2 is negative, i.e. whether the output V2 has been inverted from lean to rich. When the value of the second delay counter CDLY2 is positive at the step 312, the routine proceeds to a step 314. On the other hand, when the value of the second delay counter CDLY2 is negative at the step 312, the routine proceeds to a step 313 where the second delay counter CDLY2 is reset (CDLY2←0), and further to the step 314. At the step 314, the second delay counter CDLY2 is incremented by a value "1" (CDLY2←CDLY2+1). Subsequently, a step 315 determines whether the value of the second delay counter CDLY2 is greater than a second rich delay time TDR2. The second rich delay time TDR2 represents a counter value corresponding to a delay time in the delay process for holding the decision of the output V2 being lean even when the output V2 has been inverted from lean to rich. The second rich delay time TDR2 is defined by a positive value. When the value of the second delay counter CDLY2 is equal to or smaller than the second rich delay time TDR2 at the step 315, the routine proceeds to the step 318. On the other hand, when the value of the second delay counter CDLY2 is lager than the second rich delay time TDR2, i.e. a time has elapsed more than the delay time in the delay process from a time point of the inversion of the output V2 from lean to rich, the routine proceeds to a step 316. At the step 316, the second delay counter CDLY2 is set to the second rich delay time TDR2 (CDLY2←TDR2). Subsequently, a step 317 sets the flag F2 (F2←1). When the flag F2 is in a set condition (F2=1), it represents that the air-fuel ratio after the delay process is rich. The routine then proceeds to the step 318.

The step 318 determines whether the flag F2 is in the reset condition, i.e. whether the air-fuel ratio after the delay process is lean. When the flag F2 is reset at the step 318, the routine proceeds to a step 319 which increases the rich skip amount RSR1 by a given value RS as represented by the following equation:

RSR1←RSR1+RS

The routine then proceeds to a step 320 which decreases the lean skip amount RSL1 by the given value RS as represented by the following equation:

RSL1←RSL1−RS

On the other hand, when the flag F2 is in the set condition at the step 318, i.e. the air-fuel ratio after the delay process is rich, the routine proceeds to a step 321 which decreases the rich skip amount RSR1 by the given value RS as represented by the following equation:

RSR1←RSR1−RS

The routine then proceeds to a step 322 which increases the lean skip amount RSL1 by the given value RS as represented by the following equation:

RSL1←RSL1+RS

From the step 320 or 322, the routine proceeds to a step 323 where the rich skip amount RSR1 or the lean skip amount RSL1 is guarded to be within a preset range, and is terminated.

Figure 13:
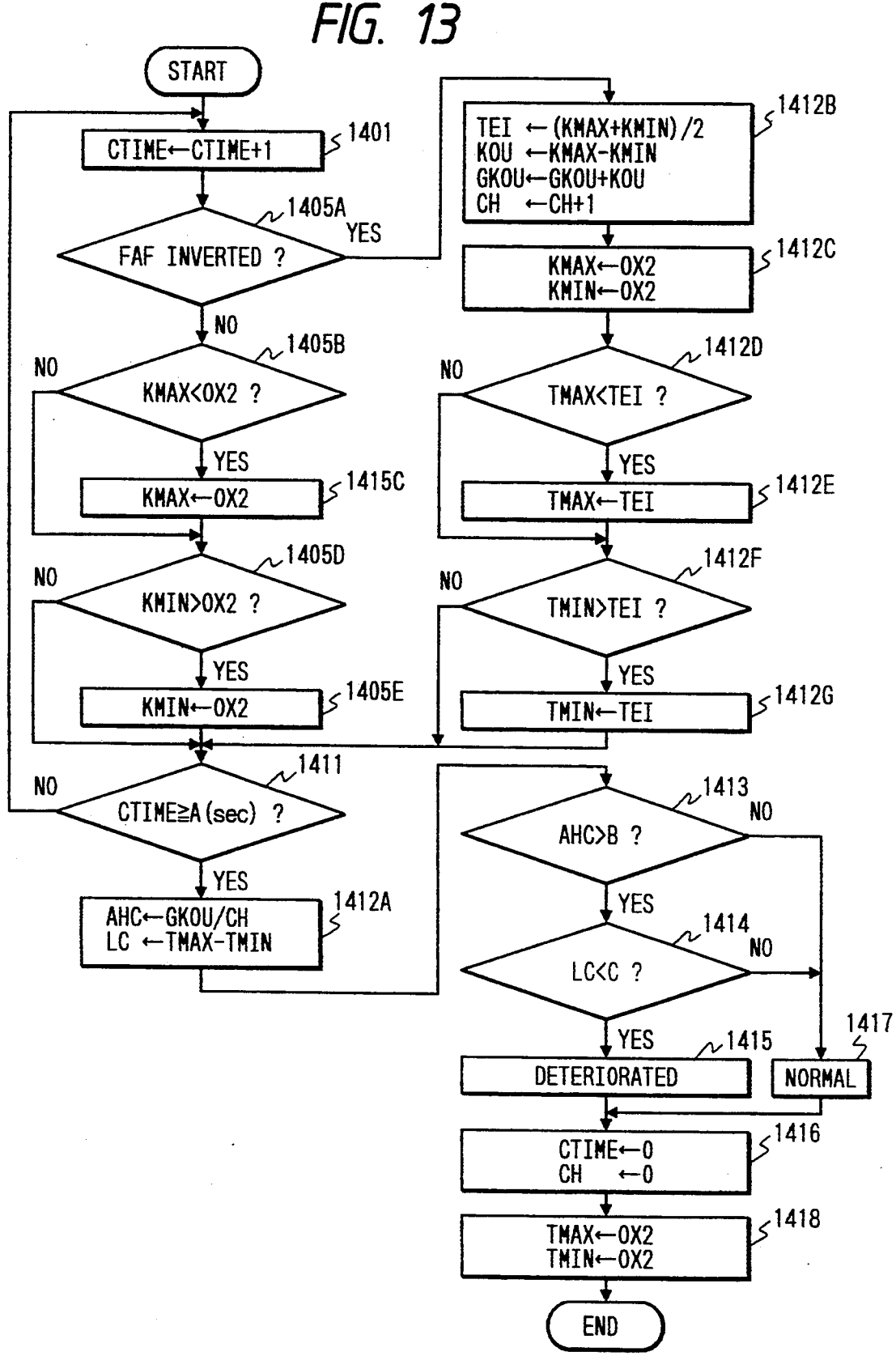
FIG. 13 is a flowchart showing a routine for detecting deterioration of the catalytic converter according to a second preferred embodiment of the present invention.

Now, a second preferred embodiment will be described hereinbelow. In the second preferred embodiment, the deterioration detecting routine of FIG. 4 in the first preferred embodiment is replaced by a routine as shown in FIG. 13. The other structure of the second preferred embodiment is the same as that of the first preferred embodiment.

The routine of FIG. 13 is executed at every given timing, such as, per 64 msec. during the air-fuel ratio feedback control for detecting the deterioration of the catalytic converter 15. In the routine of FIG. 13, those steps which execute the same processes as those in the routine of FIG. 4 are respectively assigned the same references as those in the routine of FIG. 4.

At the first step 1401, the detecting time counter CTIME is incremented by a value "1". A subsequent step 1405A determines whether the main correction coefficient FAF has been inverted either from its rich correction side to its lean correction side or from its lean correction side to its rich correction side. The step 1405A is executed for detecting a period of the main air-fuel ratio feedback control. If the inversion of the coefficient FAF is determined at the step 1405A, the routine proceeds to a step 1412B. On the other hand, the inversion of the coefficient FAF is not determined at the step 1405A, the routine proceeds to a step 1405B.

Through steps 1405B to 1405E, a maximum value KMAX and a minimum value KMIN of values $OX_2$ of the output V2 of the downstream-side $O_2$ sensor 18 during one period of the main air-fuel ratio feedback control are respectively derived. The maximum and minimum values KMAX and KMIN will be used for deriving a high-frequency amplitude of the output V2. The routine then proceeds to the step 1411.

At the step 1412B, a mean value TEI of the maximum and minimum values KMAX and KMIN is derived. This mean value TEI represents a low-frequency component of the output V2. The step 412B further derives the high-frequency amplitude KOU of the output V2 by subtracting the minimum value KMIN from the maximum value KMAX. The step 1412B further derives a high-frequency amplitude accumulation value GKOU by accumulating the high-frequency amplitudes KOU. The accumulation value GKOU will be used for deriving a mean value of the high-frequency amplitudes. Further, the step 1412B increments a main air-fuel ratio feedback control period counter CH by a value "1". The period counter CH will be also used for deriving the mean value of the high-frequency amplitudes.

Subsequently, the routine proceeds to a step 1412C where the maximum and minimum values KMAX and KMIN are respectively set to a current value $OX_2$ of the output V2 for derivation of the maximum and minimum values KMAX and KMIN during the next period of the main air-fuel ratio feedback control.

Through subsequent steps 1412D to 1412G, a maximum value TMAX and a minimum value TMIN of the mean value TEI are respectively derived. The maximum and minimum values TMAX and TMIN will be used for deriving a low-frequency amplitude.

The routine now proceeds to the step 1411 which determines whether the value of the detecting time counter CTIME is equal to or greater than a given time period A, such as, 20 sec. When the counter value is equal to or greater than the given time period A, the routine proceeds to a step 1412A where a mean value AHC of the high-frequency amplitudes of the output V2 is derived (AHC←GKOU/CH), and a low-frequency amplitude LC is further derived (LC←TMAX−TMIN).

Subsequently, through the steps 1413 and 1414, a condition of the catalytic converter 15 is determined.

Specifically, when the mean value AHC of the high-frequency amplitudes is greater than a given value B at the step 1413 and when the low-frequency amplitude LC is smaller than a given value C at the step 1414, the step 1415 determines that the catalytic converter 15 is deteriorated and activates the alarm 19. On the other hand, when the high-frequency amplitude mean value AHC is equal to or smaller than the given value B at the step 1413 or when the low-frequency amplitude LC is equal to or greater than the given value C at the step 1414, the step 1417 determines that the catalytic converter 15 is normal.

From the step 1415 or 1417, the routine proceeds to the step 1416 which resets the detecting time counter CTIME and the period counter CH, respectively. The routine further proceeds to a step 1418 where the maximum and minimum values TMAX and TMIN are respectively set to a current value $OX_2$ of the output V2 for derivation of the maximum and minimum values TMAX and TMIN during the next given time period A.

Figure 14:
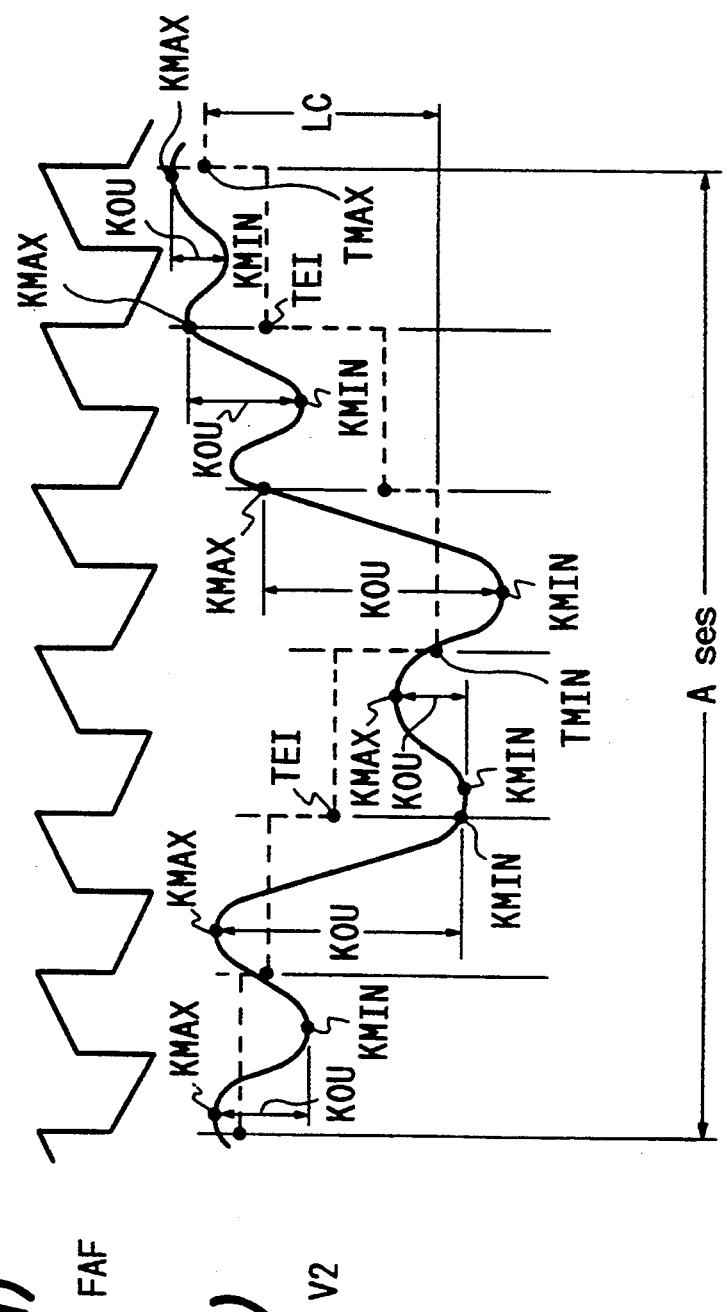
FIGS. 14(a) and 14(b) are time charts showing waveforms of the main air-fuel ratio correction coefficient and the output of the downstream-side $O_2$ sensor.

As shown in FIGS. 14(*a*) and 14(*b*), through the execution of the routine of FIG. 13, the maximum and minimum values KMAX and KMIN of the values $OX_2$ of the output V2, the mean value TEI of the maximum and minimum values KMAX and KMIN, and the high-frequency amplitude KOU can be respectively derived at every period of the main air-fuel ratio feedback control. Further, the mean value AHC of the high-frequency amplitudes KOU, the maximum and minimum values TMAX and TMIN of the low-frequency component in the output V2, and the low-frequency amplitude LC of the output V2 can be respectively derived at every given time period A.

Figure 15:
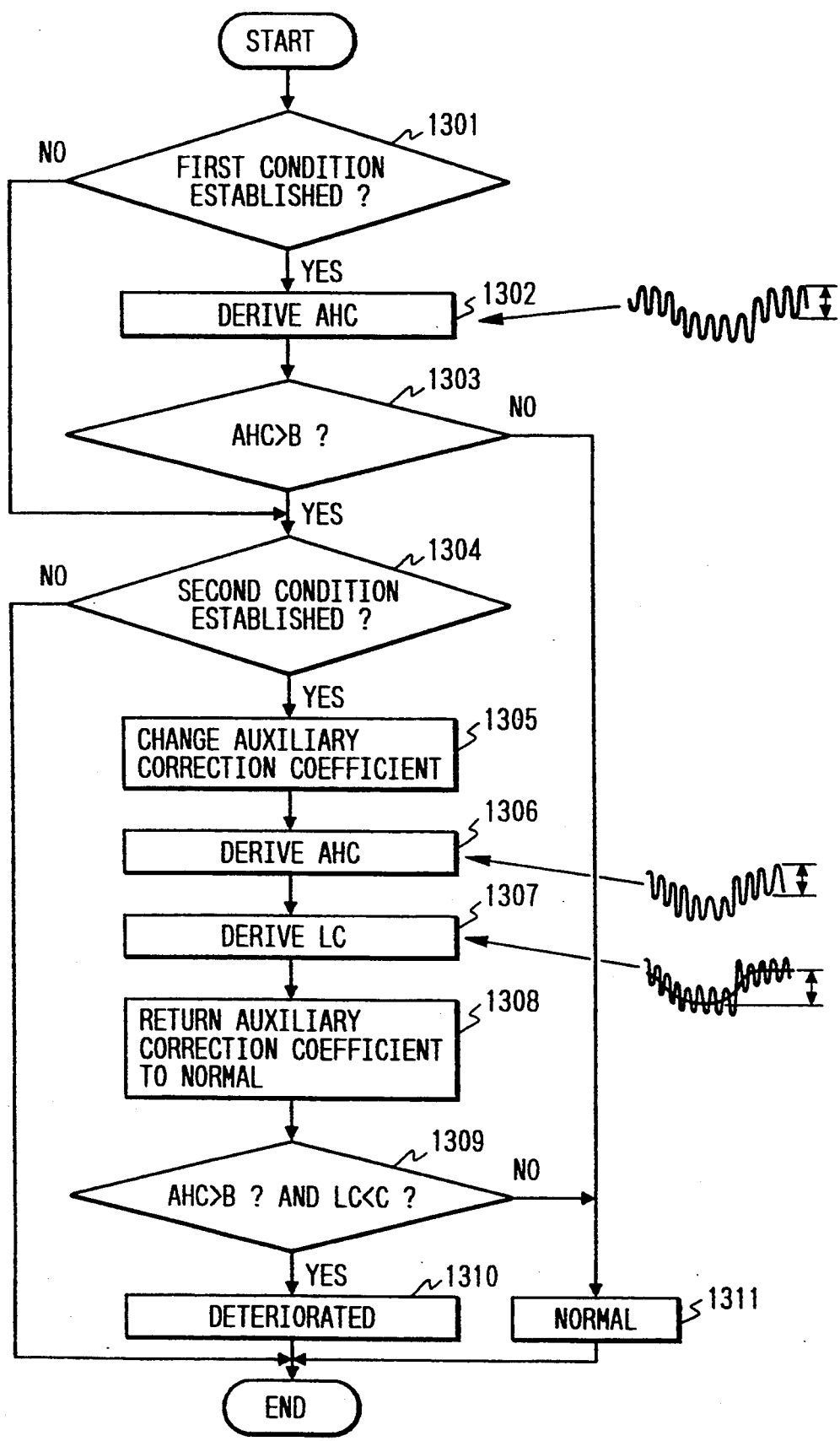
FIG. 15 is a flowchart showing a routine for detecting deterioration of the catalytic converter according to a third preferred embodiment of the present invention.

Now, a third preferred embodiment will be described hereinbelow. The third preferred embodiment differs from the first or second preferred embodiment that the routine of FIG. 4 or FIG. 13 is replaced by a routine as shown in FIG. 15, the routine of FIG. 7 is omitted, and the steps 501 to 506 are omitted in the routine of FIG. 11. The other structure of the third preferred embodiment is the same as that of the first or second preferred embodiment.

The routine of FIG. 15 is executed at every given timing, such as, per 64 msec. for detecting the deterioration of the catalytic converter 15.

A first step 1301 determines whether a condition for measuring a high-frequency amplitude KOU of the output V2 (hereinafter referred to as "first detecting condition") is satisfied. The first detecting condition is determined to be established when, for example, the engine is under the normal driving condition except during the immediate transitional driving and the fuel cut-off. When the first detecting condition is established at the step 1301, the routine proceeds to a step 1302. On the other hand, when the first detecting condition is not established at the step 1301, the routine proceeds to a step 1304.

The step 1302 derives a mean value AHC of high-frequency amplitudes KOU of the output V2. Subsequently, a step 1303 determines whether the high-frequency amplitude mean value AHC is greater than a given value B. When the mean value AHC is equal to or smaller than the given value B at the step 1303, the routine proceeds to a step 1311 which determines that the catalytic converter 15 is normal, and is terminated. On the other hand, when the mean value AHC is greater than the given value B at the step 1303, the routine proceeds to a step 1304.

The step 1304 determines whether a condition for measuring a high-frequency amplitude KOU and a low-frequency amplitude LC of the output V2 (hereinafter referred to as "second detecting condition") is satisfied. The second detecting condition is determined to be established when, for example, the engine is under the substantially steady driving condition. When the second detecting condition is not satisfied at the step 1304, the routine is terminated. On the other hand, when the second detecting condition is established at the step 1304, the routine proceeds to a step 1305 which changes an auxiliary air-fuel ratio correction coefficient. In this preferred embodiment, this auxiliary air-fuel ratio correction coefficient represents the rich skip amount RSR1 as determined at the step 319 or 321 in FIG. 12.

The routine then proceeds to a step 1306 which derives a mean value AHC of the high-frequency amplitudes of the output V2. A subsequent step 1307 derives the low-frequency amplitude LC. Thereafter, a step 1308 returns the auxiliary air-fuel ratio correction coefficient to a normal value as determined at the step 319 or 321 in FIG. 12.

The routine now proceeds to a step 1309 where the high-frequency amplitude mean value AHC derived at the step 1306 is compared with a given value B, and the low-frequency amplitude LC derived at the step 1307 is compared with a given value C. When the step 1309 determines that the high-frequency amplitude mean value AHC is greater than the given value B and that the low-frequency amplitude LC is smaller than the given value C, the routine proceeds to a step 1310 which determines that the catalytic converter 15 is deteriorated and activates the alarm 19, and is terminated. On the other hand, when the step 1309 determines otherwise, the routine proceeds to a step 1311 which determines that the catalytic converter 15 is normal, and is terminated.

Figures 16, 17:
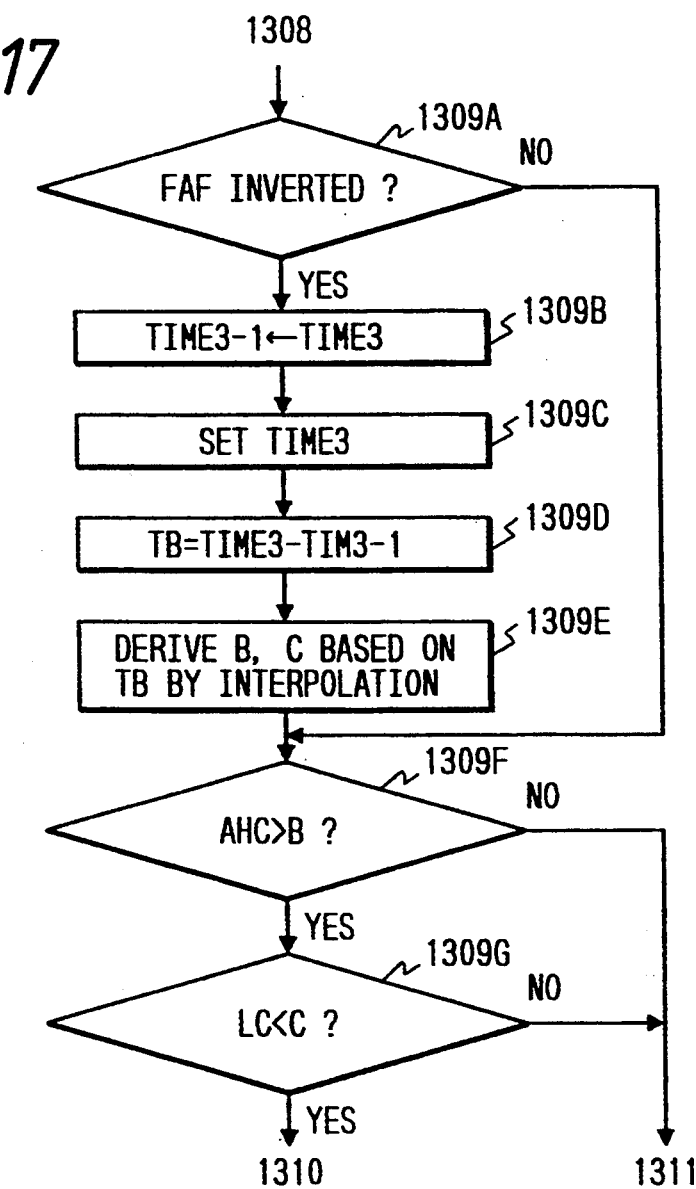
FIG. 16 is a diagram showing high-frequency amplitude criterion values and low-frequency amplitude criterion values corresponding to respective periods of the main air-fuel ratio feedback control.
FIG. 17 is a flowchart showing a routine for determining whether the high-frequency amplitude is large and the low-frequency amplitude is small, according to the third preferred embodiment.

The given values B and C used as criterion values at the step 1309 may be respectively set to fixed values for each of categorized engine driving conditions. On the other hand, as shown in FIG. 16, when these values B and C are respectively set to different values depending on a magnitude of a period of the main air-fuel ratio feedback control, the accuracy of detecting the deterioration of the catalytic converter 15 is enhanced.

Now, the process executed at the step 1309 in FIG. 15 will be explained in detail with reference to FIG. 17.

A first step 1309A determines whether the main correction coefficient FAF has been inverted from its rich correction side to its lean correction side. The step 1309A makes this decision based on the condition of the flag F1 in the routine of FIG. 11. When the main correction coefficient FAF has been inverted at the step 1309A, the routine proceeds to a step 1309B. On the other hand, when the main correction coefficient FAF has not been inverted at the step 1309A, the routine proceeds to a step 1309F. Through steps 1309B to 1309D, a duration TB between a last inversion of the main correction coefficient FAF from its rich side to its lean side and a current inversion of the coefficient FAF from its rich side to its lean side is derived. This duration TB represents a period of the main air-fuel ratio feedback control. The routine then proceeds to a step 1309E where the given values B and C are respectively derived by interpolation using the duration TB and values indicated in FIG. 16, and further to the step 1309F.

The step 1309F compares the high-frequency amplitude mean value AFIC with the given value B for determining the condition of the catalytic converter 15 as described above at the step 1309. The routine then proceeds to a step 1309G which compares the low-frequency amplitude LC with the given value C for determining the condition of the catalytic converter 15 as also described above at the step 1309.

According to the routine of FIG. 15, by measuring the high-frequency amplitudes and deriving the mean value thereof at the step 1302 under the normal driving condition or range of the engine, the following step 1303 can detect a clearly or obviously normal condition of the catalytic converter 15. Thereafter, through the following steps, a condition of the catalytic converter 15 is examined more precisely so as to make an accurate decision whether the catalytic converter 15 is deteriorated or normal.

Now, the process executed at the step 1305 for changing the auxiliary air-fuel ratio correction coefficient will be explained in detail with reference to a time chart of FIGS. 18(a) to 18(f).

When the step 1304 in FIG. 15 determines that the second detecting condition is established, the auxiliary air-fuel ratio correction coefficient is corrected by an integral process or a skip process as shown in FIG. 18(f). This correction of the auxiliary air-fuel ratio correction coefficient is performed based on a condition of a flag XRO2D as indicated FIG. 18(e). The condition of the flag XRO2D is determined based on a rich/lean waveform of the output V2 of the downstream-side $O_2$ sensor 18.

Specifically, the condition of the flag XRO2D is inverted between "1" and "0" after a lapse of a preset delay time T1 msec. from a time point when the rich/lean waveform of the output V2 is inverted between rich and lean. On the other hand, when the rich/lean waveform of the output V2 is further inverted between rich and lean within the delay time T1 msec., i.e. before the lapse of the dely time T1 msec., the condition of the flag XRO2D is not inverted between "1" and "0". For example, as shown in FIGS. 18(a) to 18(f), when the rich/lean waveform of the output V2 is inverted from lean to rich, the condition of the flag XRO2D is inverted from "0" to "1" after a lapse of the delay time T1 msec. On the other hand, when the rich/lean waveform of the output V2 is inverted from rich to lean before the lapse of the delay time T1 msec., the flag XRO2D maintains the condition of "0". This means that the condition of the flag XRO2D has a delay of the time T1 msec. relative to the rich/lean waveform of the output V2, and in addition, is inverted only when the rich/lean waveform of the output V2 maintains the same condition longer than the time T1 msec.

The step 1305 derives the auxiliary air-fuel ratio correction coefficient based on the flag XRO2D, and further sets integral constants and skip constants for the auxiliary air-fuel ratio correction coefficient to given values.

By changing the auxiliary air-fuel ratio correction coefficient, the low-frequency amplitudes LC in the output V2 appear clearly particularly when the catalytic converter has a high purification rate, so that the detection accuracy for the deterioration of the catalytic converter is highly improved.

The process executed at the step 1305 for changing the auxiliary air-fuel ratio correction coefficient will be further explained in detail with reference to FIGS. 19 and 20.

Figure 19:
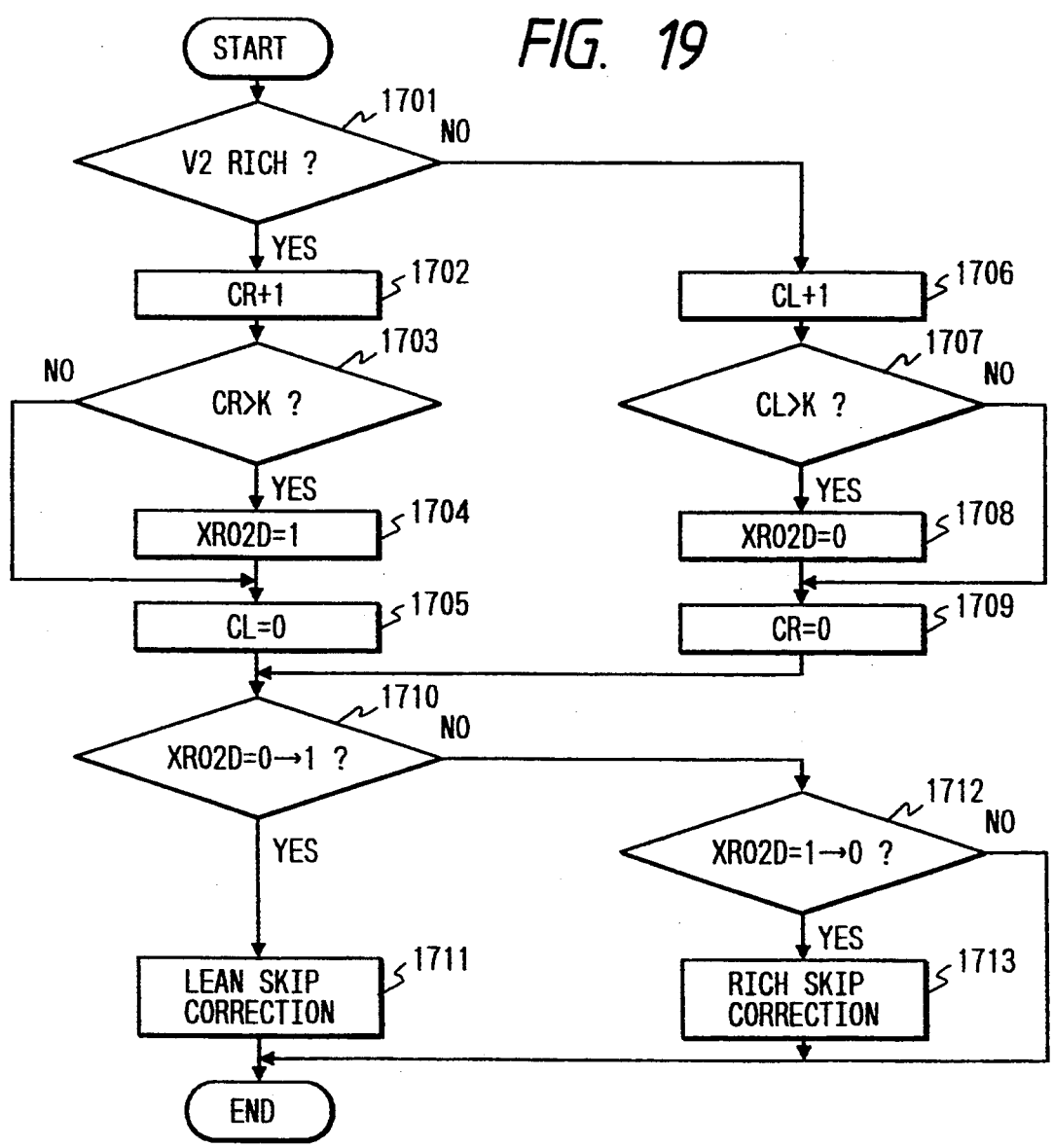
FIG. 19 is a flowchart showing a skip correction routine for the auxiliary air-fuel ratio correction coefficient according to the third preferred embodiment.

FIG. 19 is a flowchart showing a skip correction routine for the auxiliary air-fuel ratio correction coefficient. This skip correction routine is executed per about 4 msec. when it is determined to execute the step 1305.

A first step 1701 determines whether the output V2 of the downstream-side $O_2$ sensor 18 is rich. When the output V2 is rich at the step 1701, the routine proceeds to a step 1702 which increments a rich counter CR by a value "1", and further to a step 1703. The step 1703 determines whether a value of the rich counter CR is greater than a preset value K which corresponds to the foregoing delay time T1 msec. When the value of the rich counter CR is equal to or smaller than the preset value K at the step 1703, the routine proceeds to a step 1705. On the other hand, when the value of the rich counter CR is greater than the preset value K, the routine proceeds to a step 1704 where the flag X2RO2D is set to "1", and further to the step 1705. The step 1705 resets a lean counter CL.

Referring back to the step 1701, when the output V2 is lean, the routine proceeds to a step 1706 which increments a lean counter CL by a value "1", and further to a step 1707. The step 1707 determines whether a value of the lean counter CL is greater than the preset value K. When the value of the lean counter CL is equal to or smaller than the preset value K at the step 1707, the routine proceeds to a step 1709. On the other hand, when the value of the lean counter CL is greater than the preset value K, the routine proceeds to a step 1708 where the flag XRO2D is reset to "0", and further to the step 1709. The step 1709 resets the rich counter CR.

From the step 1705 or 1709, the routine proceeds to a step 1710 which determines whether the flag XRO2D has been inverted from "0" to "1". When the flag XRO2D has been inverted from "0" to "1" at the step 1710, the routine proceeds to a step 1711 which decreases the auxiliary air-fuel ratio correction coefficient by a given lean skip amount. On the other hand, when the flag XRO2D has not been inverted from "0" to "1" at the step 1710, the routine proceeds to a step 1712 which determines whether the flag XRO2D has been inverted from "1" to "0". When the flag XRO2D has not been inverted from "1" to "0" at the step 1712, the routine is terminated. On the other hand, when the flag XRO2D has been inverted from "1" to "0" at the step 1712, the routine proceeds to a step 1713 which increases the auxiliary air-fuel ratio correction coefficient by a given rich skip amount.

Figure 20:
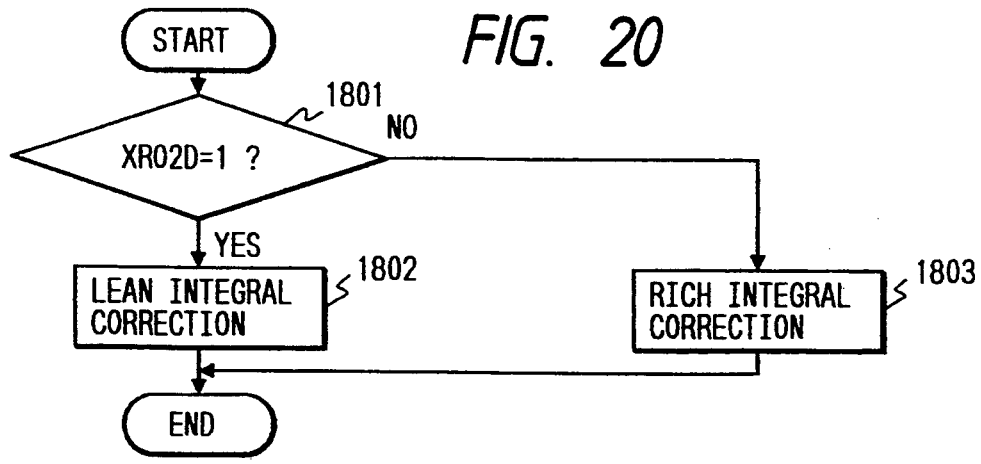
FIG. 20 is flowchart showing an integral correction routine for the auxiliary air-fuel ratio correction coefficient according to the third preferred embodiment.
Figure 22:
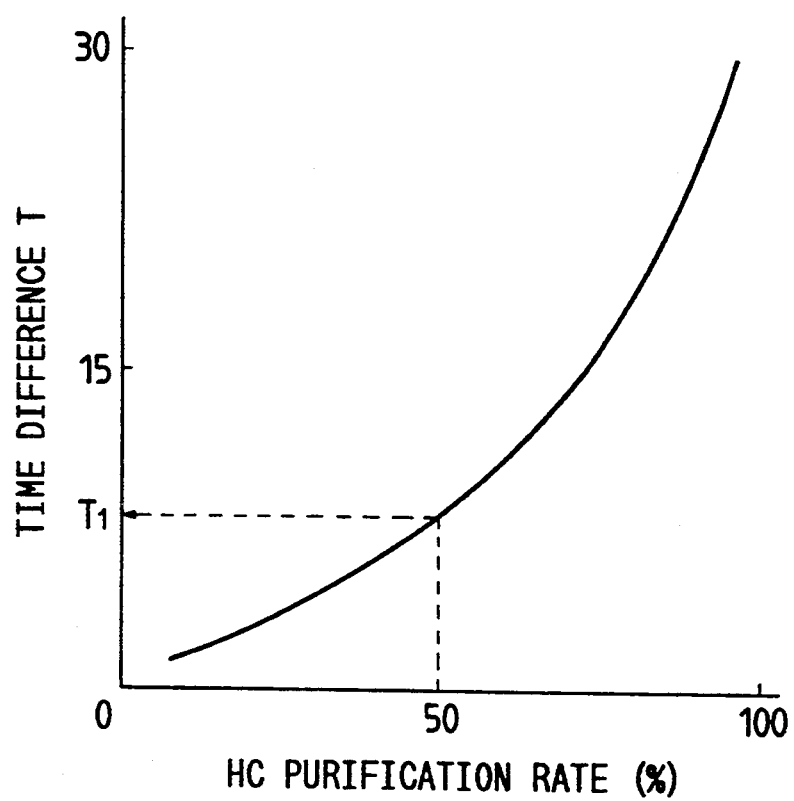
FIG. 22 is a map showing a relationship between a purification rate of the catalytic converter and a time difference.

FIG. 20 is a flowchart showing an integral correction routine for the auxiliary air-fuel ratio correction coefficient. This integral correction routine is executed per about 500 msec. when it is determined to execute the step 1305.

A first step 1801 determines whether the flag XRO2D is set to "1". When the flag XRO2D is set, the routine proceeds to a step 1802 which decreases the auxiliary air-fuel ratio correction coefficient by a given lean integral amount. On the other hand, when the flag XRO2D is reset to "0", the routine proceeds to a step 1803 which increases the auxiliary air-fuel ratio correction coefficient by a given rich integral amount.

As appreciated, the step 1305 in FIG. 15 performs the skip/integral control of the auxiliary air-fuel ratio correction coefficient based on the condition of the flag XRO2D. In this preferred embodiment, the rich and lean skip amounts and the rich and lean integral amounts are respectively set to large values relative to the normal auxiliary air-fuel ratio correction coefficient.

Instead of changing the auxiliary air-fuel ratio correction coefficient as executed at the step 1305, the auxiliary air-fuel ratio correction coefficient may be controlled regularly in an open-loop control. In this case, one of the auxiliary air-fuel ratio correction coefficients, i.e. the skip amounts RSR1, RSL1, the integral constants KIR1, KIL1 and the first delay times TDR1, TDL1 may be changed in the open-loop control.

In the foregoing third preferred embodiment, the derivation of the high-frequency amplitude mean value AHC at the steps 1302 and 1306 and the derivation of the low-frequency amplitude LC at the step 1307 may be performed using the method as shown in FIG. 4 of the first preferred embodiment or FIG. 13 of the second preferred embodiment. When considering the detection accuracy, however, it is preferable to use the method as shown in FIG. 13 of the second preferred embodiment.

Now, a fourth preferred embodiment for detecting the deterioration of the three way catalytic converter 15 will be described hereinbelow.

FIGS. 21(a)(1) to 21(c)(2) show a relationship between waveforms of the auxiliary air-fuel ratio correction coefficient and the output V2 of the downstream-side O2 sensor 18 for each of three different purification rates of the catalytic converter 15 for HC. In FIGS. 21(a(1) to 21(c)(2), each of dashed lines indicated on the waveforms of the output V2 represents a low-frequency component of the output V2 corresponding to a time-domain variation of the auxiliary air-fuel ratio correction coefficient. FIGS. FIGS. 21(a)(1) and 21(a)(2) depict an HC purification rate of 90%, FIGS. 21(b)(1) and 21(b)(2) a purification rate of 70%, and FIGS. 21(c)(1) and 21(c)(2) a purification rate of 20%.

As shown in FIGS. 21(a)(1) to 21(c)(2), a time difference T of the low-frequency component of the output V2 relative to the time-domain variation of the auxiliary air-fuel ratio correction coefficient is large when the purification rate of the catalytic converter is high, and decreases as a deterioration degree of the catalytic converter advances, i.e. the purification rate of the catalytic converter decreases (90%→70%→20%).

Accordingly, in this preferred embodiment, when the above-noted time difference T is smaller than a given value, it is determined that the catalytic converter 15 is deteriorated.

Figure 23:
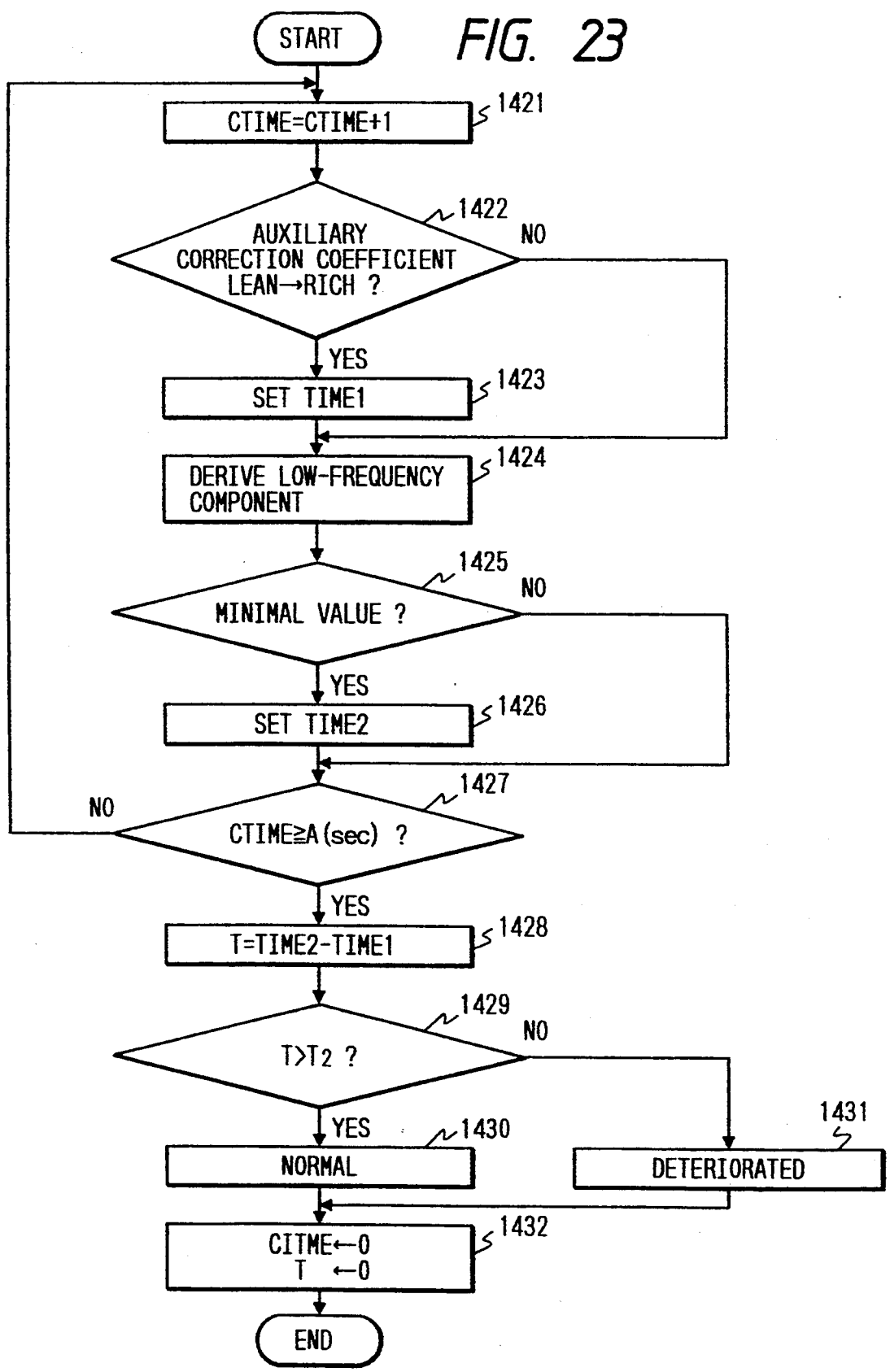
FIG. 23 is a flowchart showing a routine for detecting deterioration of the catalytic converter according to a fourth preferred embodiment of the present invention.

FIG. 23 is a characteristic graph showing a relationship between the time difference T and the purification rate of the catalytic converter 15. For determining the deterioration of the catalytic converter when the purification rate thereof is less than 50%, a criterion value of the time difference may be set to T1.

Now, a routine for detecting the deterioration of the catalytic converter 15 will be described hereinbelow with reference to a flowchart of FIG. 23. This routine is executed at every given timing, such as, per 64 msec.

At a first step 1421, a detecting time counter CTIME is incrrernented by a value "1". Subsequently, a step 1422 determines whether the auxiliary air-fuel ratio correction coefficient has been inverted from its decreasing side to its increasing side, i.e. whether a varying direction of the auxiliary air-fuel ratio correction coefficient has been inverted from increasing to decreasing. Details of the step 1422 will be described later. If such inversion is not determined at the step 1422, the routine proceeds to a step 1424. On the other hand, if such inversion is determined at the step 1422, the routine proceeds to a step 1423 where a time of the inversion is set as TIME1, and further to the step 1424.

The step 1424 derives a low-frequency component of the output V2. Details of the step 1424 will be described later. The routine then proceeds to a step 1425 which determines whether a value of the low-frequency component derived at the step 1424 is a minimal value, i.e. a lean peak value. Details of the step 1425 will be described later. When the step 1425 determines that it is not the minimal value, the routine proceeds to a step 1427. On the other hand, when the step 1425 determines that it is the minimal value, the routine proceeds to a step 1426 where a time of the positive determination at the step 1425 is set as TIME2. The routine then proceeds to the step 1427.

The step 1427 determines whether a value of the detecting time counter CTIME is equal to or greater than a given time A(sec). When the counter value is smaller than the given time A, the routine returns to the step 1421. On the other hand, when the counter value is equal to or greater than the given time A, the routine proceeds to a step 1428 which derives the time difference T from TIME1 to TIME2. Thereafter, a step 1429 determines whether the time difference T is greater than a preset value T2. When the time difference T is greater than the preset value T2, a step 1430 determines that the catalytic converter 15 is normal. On the other hand, when the time difference T is equal to or smaller than the preset value T2, a step 1431 determines that the catalytic converter 15 is deteriorated, and activates the alarm 19.

From the step 1430 or 1431, the routine proceeds to a step 1432 which resets the detecting time counter CTIME and sets the time difference T to "0", and then is terminated.

Since the routine for deriving the fuel injection amount TAU is the same as that which is shown in FIG. 10 in the first preferred embodiment, explanation thereof is omitted for avoiding redundant description.

Figure 24:
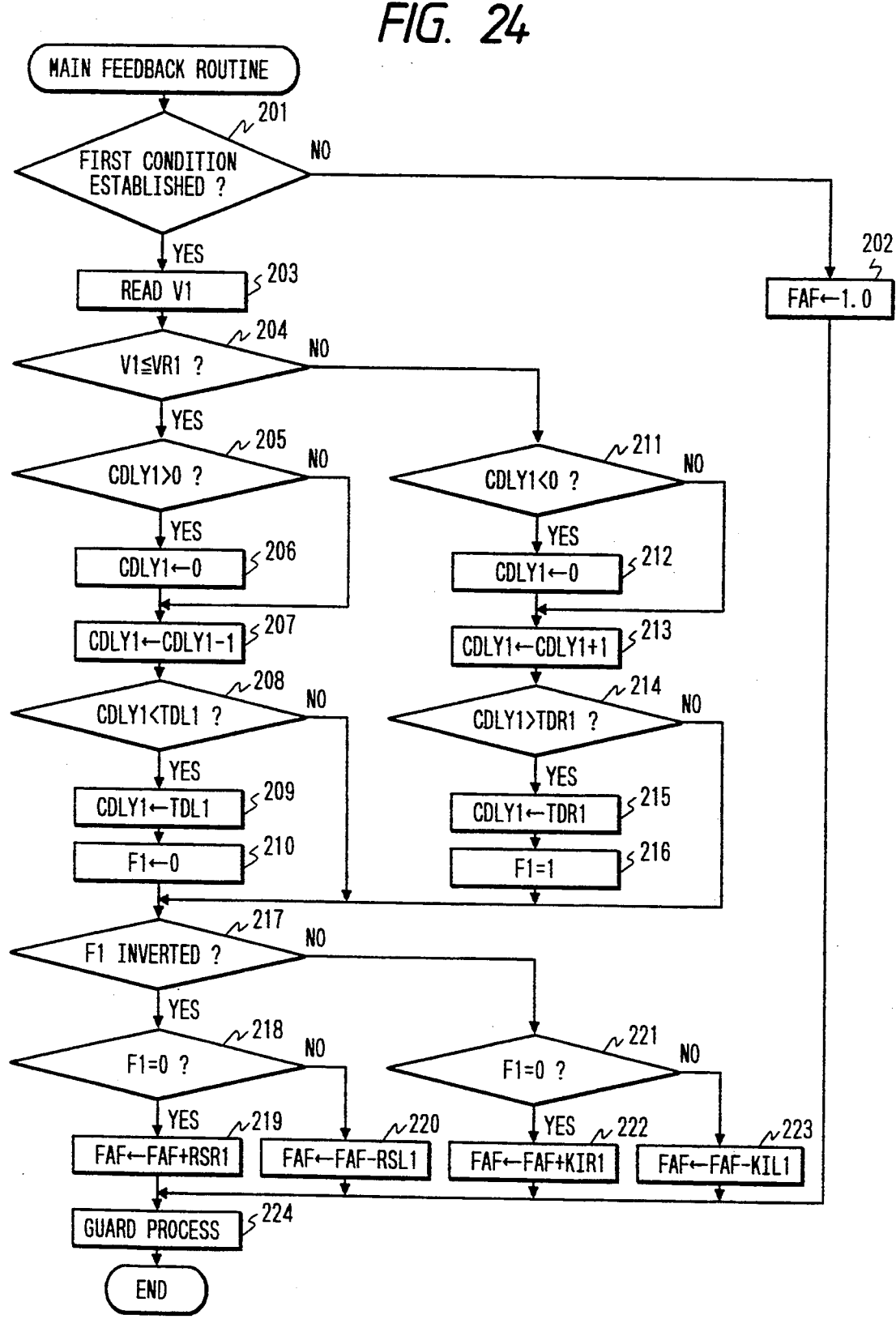
FIG. 24 is a flowchart showing a routine of the main air-fuel ratio feedback control according to the fourth preferred embodiment.

FIG. 24 is a flowchart showing a routine of the main air-fuel ratio feedback control to be executed by the ECU20 based on the output V1 of the upstream-side O2 sensor 16 for setting the main correction coefficient FAF. Since this routine only differs from the routine of FIG. 11 in the first preferred embodiment in that the steps 501 to 506 are omitted, no further explanation thereof will be made hereinbelow for avoiding the redundant description.

Figure 25A:
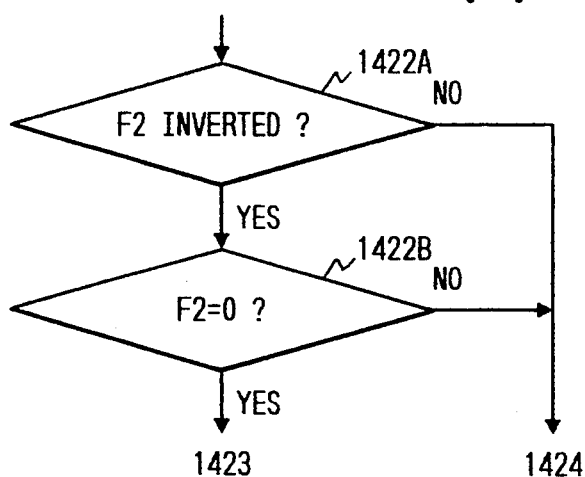
FIG. 25(a) is a flowchart showing a detailed routine of a step 1422 in the routine of FIG. 23.

Now, details of the foregoing step 1422 will be explained with reference to a flowchart of FIG. 25(a).

The step 1422 determines whether the auxiliary air-fuel ratio correction coefficient, i.e. the rich skip amount RSR1 in this preferred embodiment has been inverted from its decreasing side to its increasing side, by checking whether the flag F2 in the routine of FIG. 12 has been inverted from "1" to "0". Specifically, in FIG. 25(a), a first step 1422A determines whether the flag F2 has been inverted between "1" and "0". When the inversion is determined at the step 1422A, the routine proceeds to a step 1422B which determines whether F2=0. When F2=0, it is determined that the auxiliary air-fuel ratio correction coefficient (the rich skip mount RSR1) has been inverted from decreasing to increasing.

Figure 25B:
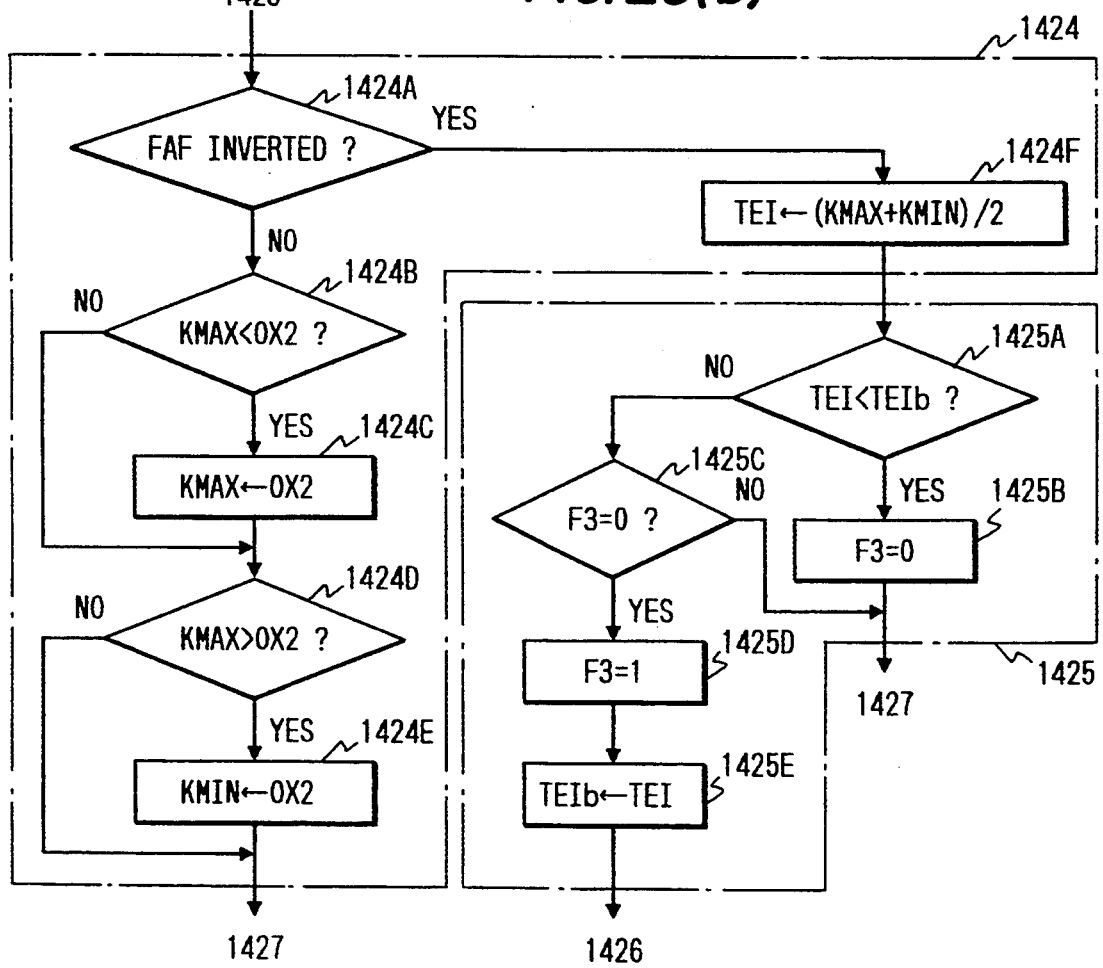
FIG. 25(b) is a flowchart showing a detailed routine of steps 1424 and 1425 in the routine of FIG. 23.

Now, details of the foregoing steps 1424 and 1425 will be explained with reference to a flowchart of FIG. 25(b).

A step 1424A determines whether the air-fuel ratio correction coefficient FAF has been inverted either from its rich correction side to its lean correction side or from its learn correction side to its rich correction side. The step 1424A makes this decision by checking the condition of the flag F1 in FIG. 24 as in FIG. 25(a). The step 1424A is executed for detecting a period of the main air-fuel ratio feedback control. When the coefficient FAF has been inverted at the step 1424A, the routine proceeds to a step 1424F. On the other hand, when the coefficient FAF has not been inverted at the step 1424A, the routine proceeds to a step 1424B.

The step 1424B compares a current value $OX_2$ of the output V2 of the downstream-side $O_2$ sensor 18 with a maximum value KMAX of the output V2 during one period of the main air-fuel ratio feedback control. When the value $OX_2$ is greater than the maximum value KMAX, the routine proceeds to a step 1424C where the maximum value KMAX is set to the value $OX_2$, and further to a step 1424D. On the other hand, when the value $OX_2$ is equal to or smaller than the maximum value KMAX at the step 1424B, the routine proceeds to the step 1424D.

The step 1424D compares the value $OX_2$ with a minimum value KMIN of the output V2 during one period of the main air-fuel ratio feedback control or one period of the air-fuel ratio correction coefficient FAF. When the value $OX_2$ is smaller than the minimum value KMIN, the routine proceeds to a step 1424E where the minimum value KMIN is set to the value $OX_2$, and further to the step 1427. On the other hand, when the value $OX_2$ is equal to or greater than the minimum value KMIN at the step 1424D, the routine proceeds to the step 1427.

Accordingly, as shown in FIGS. 14(a) and 14(b), the maximum and minimum values KMAX and KMIN of the values $OX_2$ of the output V2 can be derived at every period of the main air-fuel ratio feedback control.

Referring back to the step 1424F, this step derives a mean value TEI of the maximum and minimum values KMAX and KMIN. As a result, as shown by a dashed line in FIG. 14(b), the low-frequency component of the output V2 can be derived at every inversion or at every skip correction of the main correction coefficient FAF from its rich correction side to its lean correction side or from its lean correction side to its rich correction side.

The routine then proceeds to a step 1425A which compares the mean value TEI with a prior or last mean value TEIb which is the mean value TEI for the last period of the main air-fuel ratio feedback control or the last period of the main correction coefficient FAF. When the mean value TEI is smaller than the last mean value TEIb, the routine proceeds to a step 1425B which sets a flag F3 to "0", and further to the step 1427. On the other hand, when the mean value TEI is equal to or greater than the last mean value TEIb, the routine proceeds to a step 1425C which determines whether F3=0. When F3 is not "0", the routine proceeds to the step 1427. On the other hand, when F3=0, the routine proceeds to a step 1425D which sets F3=1, and further to a step 1425E where the current mean value TEI is set as the last mean value TEIb for a next execution of the step 1425A. The routine then proceeds to the step 1426. As appreciated, a time point when the mean value TEI has been inverted from decreasing to increasing can be considered a time point when the low-frequency component of the output V2 is a minimal value.

In the fourth preferred embodiment, the time difference T is represented by a difference between a time point when a minimal value of the auxiliary air-fuel ratio correction coefficient occurs and a time point when a minimal value of the low-frequency component of the output V2 occurs. However, a different manner may be used to derive the time difference T. For example, as shown in FIG. 26(a), the step 1422B may determine whether F2=1, and as shown in FIG. 26(b), the step 1425A may determine whether the mean value TEI is greater than the last mean value TEIb. As appreciated, in this modification, maximal values are used to derive the time difference T.

Further, in the foregoing third and fourth preferred embodiments, the rich skip amount RSR1 is used as the auxiliary air-fuel ratio correction coefficient to be used at the step 1305 in FIG. 15 and at the step 1422 in FIG. 23. However, the lean skip amount RSL1 may be used therefor. Moreover, in the first to fourth preferred embodiments, the auxiliary air-fuel ratio correction coefficients controlled by the auxiliary air-fuel ratio feedback control of FIG. 12 may be changed to other auxiliary air-fuel ratio correction coefficients. Specifically, the skip mounts RSR1, RSL1 at the steps 319 to 322 and the steps 302 and 303 in FIG. 12 may be replaced by the integral constants KIR1, KIL1 as shown in FIGS. 26(c)(1) to 26(c)(3) or by the delay times TDR1, TDL1 as shown in FIGS. 26(d)(1) to 26(d)(3). In this case, the integral constant KIR1, KIL1 or the delay time TDR1, TDL1 is used at the step 1305 in FIG. 15 and at the step 1422 in FIG. 23 in the third and fourth preferred embodiments.

Now, a fifth preferred embodiment for detecting the deterioration of the three way catalytic converter 15 will be described with reference to a flowchart of FIG. 27.

The fifth preferred embodiment determines the condition of the catalytic converter 15 based only on a period of the low-frequency component of the output V2 of the downstream-side $O_2$ sensor 18. Since the period of the low-frequency component of the output V2 is not so affected by fluctuation in output response of the upstream-side and downstreams-side $O_2$ sensors, the fifth preferred embodiment still works effectively although its detection accuracy is reduced in comparison with the foregoing preferred embodiments.

Figure 27:
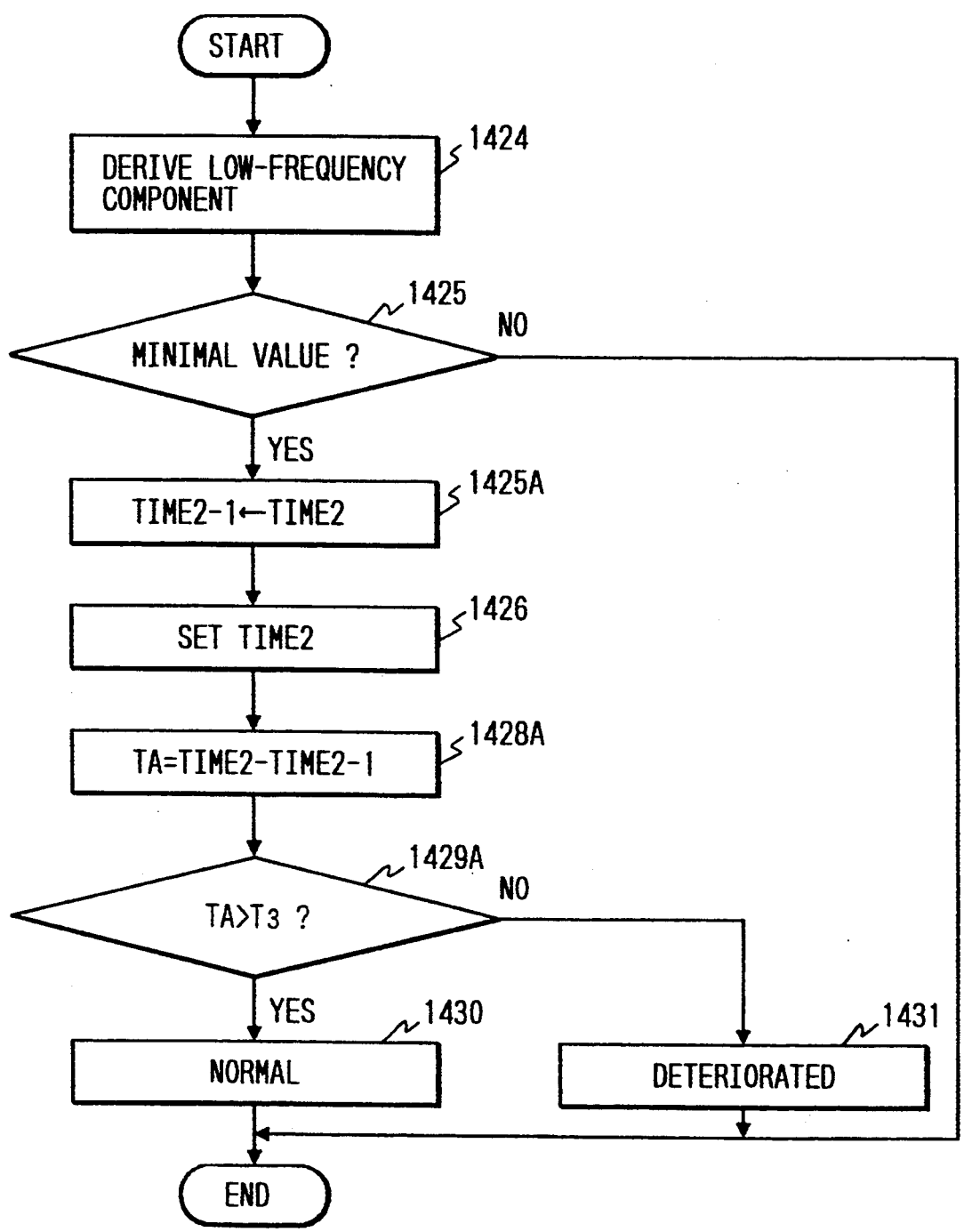
FIG. 27 is a flowchart showing a routine for detecting deterioration of the catalytic converter according to a fifth preferred embodiment of the present invention.

The fifth preferred embodiment differs from the fourth preferred embodiment in that the routine of FIG. 23 is replaced by the routine of FIG. 27.

In FIG. 27, the steps 142 1, 1422, 1423, 1427 and 1432 in FIG. 23 are omitted. On the other hand, a step 1425A is additionally provided between the steps 1425 and 1426. At the step 1425A, TIME2 is set as TIME2$_{-1}$. TIME2 at the step 1425A represents a time when the low-frequency component of the output V2 became a minimal value last time, and is stored in the RAM 105. On the other hand, TIME2 at the step 1426 represents a time when the flow-frequency component of the output V2 has become a minimal value during the current cycle of this routine. Further, the step 1428 in FIG. 23 is replaced by a step 1428A which derives a period TA of the low-frequency component of the output V2 by subtracting TIME2$_{-1}$ at the step 1425A from TIME2 at the step 1426. Still further, the step 1429 in FIG. 23 is replaced by a step 1429A which determines whether the period TA is greater than a given value T3. When TA>T3, the step 1430 determines that the catalytic converter 15 is normal. On the other hand, when TA≦T3, the step 1431 determines that the catalytic converter 15 is deteriorated.

In a modification of the fifth preferred embodiment, it may be arranged to derive only the low-frequency amplitude and to determine that the catalytic converter 15 is deteriorated when the low-frequency amplitude is smaller than a given value. Since the low-frequency amplitude is not so affected by fluctuation in output response of the upstream-side and downstream-side $O_2$ sensors, this modification can also works effectively similar to the fifth preferred embodiment.

It is to be understood that this invention is not to be limited to the preferred embodiments and modifications described above, and that various changes and modifications may be made without departing from the spirit and scope of the invention as defined in the appended claims.

What is claimed is:

1. A system for an engine, comprising:
   a catalytic converter, provided in an exhaust system of said engine, for purifying exhaust gas discharged from said engine;
   an upstream-side oxygen sensor, provided upstream of said catalytic converter, for detecting whether an air-fuel ratio of an air-fuel mixture is rich or lean with respect to a stoichiometric air-fuel ratio, based on exhaust gas upstream of said catalytic converter;
   a downstream-side oxygen sensor, provided downstream of said catalytic converter, for detecting whether said air-fuel ratio of said air-fuel mixture is rich or lean with respect to said stoichiometric air-fuel ratio, based on exhaust gas having passed through said catalytic converter;
   means for deriving a main air-fuel ratio correction coefficient based on an output of said upstream-side oxygen sensor, said main air-fuel ratio correction coefficient being derived for correcting an air-fuel ratio of an air-fuel mixture to be fed to said engine so as to be near said stoichiometric air-fuel ratio;
   engine control means for controlling said air-fuel ratio of said air-fuel mixture to be fed to said engine so as to be near said stoichiometric air-fuel ratio, using said main air-fuel ratio correction coefficient;
   means for deriving a low-frequency component in an output of said downstream-side oxygen sensor; and
   means for detecting deterioration of said catalytic converter based on said low-frequency component.

2. A system for an engine, comprising:
   a catalytic converter, provided in an exhaust system of said engine, for purifying exhaust gas discharged from said engine;
   an upstream-side oxygen sensor, provided upstream of said catalytic converter, for detecting whether an air-fuel ratio of an air-fuel mixture is rich or lean with respect to a stoichiometric air-fuel ratio, based on exhaust gas upstream of said catalytic converter;
   a downstream-side oxygen sensor, provided downstream of said catalytic converter, for detecting whether said air-fuel ratio of said air-fuel mixture is rich or lean with respect to said stoichiometric air-fuel ratio, based on exhaust gas having passed through said catalytic converter;
   means for deriving a main air-fuel ratio correction coefficient based on an output of said upstream-side oxygen sensor, said main air-fuel ratio correction coefficient being derived for correcting an air-fuel ratio of an air-fuel mixture to be fed to said engine so as to be near said stoichiometric air-fuel ratio;
   engine control means for controlling said air-fuel ratio of said air-fuel mixture to be fed to said engine so as to be near said stoichiometric air-fuel ratio, using said main air-fuel ratio correction coefficient;
   means for deriving a low-frequency component in an output of said downstream-side oxygen sensor;
   means for detecting deterioration of said catalytic converter based on said low-frequency component; and
   means for deriving an auxiliary air-fuel ratio correction coefficient based on said output of said downstream-side oxygen sensor, said auxiliary air-fuel ratio correction coefficient being derived for finely adjusting said main air-fuel ratio correction coefficient;
   said means for detecting deterioration of said catalytic converter including means for detecting deterioration of said catalytic converter based on a time difference between a time-domain variation of said auxiliary air-fuel ratio correction coefficient and a corresponding variation of said low-frequency component.

3. The system as set forth in claim 2, wherein said deterioration detecting means includes means for determining that said catalytic converter is deteriorated when said time difference is smaller than a preset value.

4. The system as set forth in claim 1, wherein said low-frequency component deriving means includes:
   means for deriving a period of said low-frequency component;
   said deterioration detecting means detecting deterioration of said catalytic converter based on said period of said low-frequency component.

5. A system for an engine comprising:
   a catalytic converter, provided in an exhaust system of said engine, for purifying exhaust gas discharged from said engine;
   an upstream-side oxygen sensor, provided upstream of said catalytic converter, for detecting whether an air-fuel ratio of an air-fuel mixture is rich or lean with respect to a stoichiometric air-fuel ratio, based on exhaust gas upstream of said catalytic converter;
   a downstream-side oxygen sensor, provided downstream of said catalytic converter, for detecting whether said air-fuel ratio of said air-fuel mixture is rich or lean with respect to said stoichiometric air-fuel ratio, based on exhaust gas having passed through said catalytic converter;
   means for deriving a main air-fuel ratio correction coefficient based on an output of said upstream-side oxygen sensor, said main air-fuel ratio correction coefficient being derived for correcting an air-fuel ratio of an air-fuel mixture to be fed to said engine so as to be near said stoichiometric air-fuel ratio;
   engine control means for controlling said air-fuel ratio of said air-fuel mixture to be fed to said engine so as to be near said stoichiometric air-fuel ratio, using said main air-fuel ratio correction coefficient;
   means for deriving a low-frequency component in an output of said downstream-side oxygen sensor; and
   means for detecting deterioration of said catalytic converter based on said low-frequency component;
   said low-frequency component deriving means including means for deriving an amplitude of said low-frequency component; and said deterioration detecting means detecting deterioration of said catalytic converter based on said amplitude of said low-frequency component.

6. The system as set forth in claim 5, wherein said low-frequency component deriving means includes means for deriving a mean value of maximum and minimum values of said output of said downstream-side oxygen sensor at every period of said main air-fuel ratio correction coefficient so as to derive said amplitude of said low-frequency component.

7. The system as set forth in claim 5, wherein said low-frequency component deriving means includes:
means for deriving a mean value of maximum and minimum values of said output of said downstream-side oxygen sensor at every period of said main air-fuel ratio correction coefficient; and
means for deriving said amplitude of said low-frequency component by deriving a difference between maximum and minimum values of said mean values during a preset time period.

8. The system as set forth in claim 1, wherein said low-frequency component deriving means includes means for smoothing said output of said downstream-side oxygen sensor by a given smoothing rate so as to derive said low-frequency component.

9. A system for an engine, comprising:
a catalytic converter, provided in an exhaust system of the engine, for purifying exhaust gas discharged from the engine;
an upstream-side oxygen sensor, provided upstream of said catalytic converter, for detecting whether an air-fuel ratio of an air-fuel mixture is rich or lean with respect to a stoichiometric air-fuel ratio, based on the exhaust gas upstream of said catalytic converter;
a downstream-side oxygen sensor, provided downstream of said catalytic converter, for detecting whether an air-fuel ratio of the air-fuel mixture is rich or lean with respect to the stoichiometric air-fuel ratio, based on the exhaust gas having passed through said catalytic converter;
means for deriving a main air-fuel ratio correction coefficient based on an output of said upstream-side oxygen sensor, said main air-fuel ratio correction coefficient being derived for correcting an air-fuel ratio of an air-fuel mixture to be fed to the engine so as to be near the stoichiometric air-fuel ratio;
engine control means for controlling said air-fuel ratio of the air-fuel mixture to be fed to the engine so as to be near the stoichiometric air-fuel ratio, using said main air-fuel ratio correction coefficient;
means for deriving a high-frequency amplitude of an output of said downstream-side oxygen sensor;
means for deriving a low-frequency amplitude of the output of said downstream-side oxygen sensor; and
means for detecting deterioration of said catalytic converter based on said high-frequency amplitude and said low-frequency amplitude.

10. The system as set forth in claim 9, wherein said deterioration detecting means includes means for determining that the catalytic converter is deteriorated when said high-frequency amplitude is greater than a preset value and said low-frequency amplitude is smaller than a preset value.

11. The system as set forth in claim 9, further comprising:
means for deriving a delay time from a time point of a predetermined variation of said main air-fuel ratio correction coefficient to a time point of a corresponding variation of the output of said downstream-side oxygen sensor; and
means for determining that the catalytic converter is deteriorated when said delay time is smaller than a preset value, irrespective of a result made by said deterioration detecting means.

12. The system as set forth in claim 9, wherein said high-frequency amplitude deriving means includes means for deriving said high-frequency amplitude by deriving a difference between maximum and minimum values of the output of said downstream-side oxygen sensor, said maximum and minimum values being derived at every period of said main air-fuel ratio correction coefficient.

13. The system as set forth in claim 9, wherein said low-frequency amplitude deriving means includes means for deriving a mean value of maximum and minimum values of the output of said downstream-side oxygen sensor at every period of said main air-fuel ratio correction coefficient, and means for deriving the low-frequency amplitude by deriving a difference between maximum and minimum values of said mean values during a preset time period.

14. The system as set forth in claim 9, further comprising:
means for deriving an auxiliary air-fuel ratio correction coefficient based on the output of said downstream-side oxygen sensor, said auxiliary air-fuel ratio correction coefficient being derived for finely adjusting said main air-fuel ratio correction coefficient;
means for determining whether a given condition is satisfied for said deterioration detecting means to detect deterioration of said catalytic converter and for allowing said deterioration detecting means to start detecting deterioration of said catalytic converter when said given condition is satisfied; and
means for changing said auxiliary air-fuel ratio correction coefficient when said condition determining means determines that said given condition is satisfied.

15. The system as set forth in claim 14, wherein said high-frequency amplitude deriving means derives said high-frequency amplitude before and after said changing means changes said auxiliary air-fuel ratio correction coefficient, and wherein said changing means changes sad auxiliary air-fuel ratio correction coefficient when said high-frequency amplitude is determined to be greater than a given value before said changing means changes said auxiliary air-fuel ratio correction coefficient and when said condition determining means determines that said given condition is satisfied.

16. The system as set forth in claim 10, wherein said deterioration detecting means includes means for setting said preset values depending on a period of said main air-fuel ratio correction coefficient, respectively.

17. The system as set forth in claim 9, wherein said low-frequency amplitude deriving means includes means for deriving a mean value of maximum and minimum values of the output of said downstream-side oxygen sensor at every period of said main air-fuel ratio correction coefficient so as to derive said low-frequency amplitude.

18. The system as set forth in claim 9, wherein said low-frequency amplitude deriving means includes means for smoothing the output of said downstream-side oxygen sensor by a given smoothing rate so as to derive said low-frequency amplitude.

19. The system as set forth in claim 9, wherein said low-frequency amplitude deriving means includes means for smoothing the output of said downstream-side oxygen sensor by a given smoothing rate, and means for deriving the low-frequency amplitude by deriving a difference between maximum and minimum values of said smoothed output of the downstream-side oxygen sensor during a preset time period.

* * * * *